United States Patent
Sharma et al.

(10) Patent No.: US 12,262,269 B2
(45) Date of Patent: *Mar. 25, 2025

(54) COMMUNICATION SYSTEM

(71) Applicant: NEC Corporation, Tokyo (JP)

(72) Inventors: Vivek Sharma, Sutton (GB); Meng Wang, Guildford (GB); Yassin Aden Awad, London (GB)

(73) Assignee: NEC CORPORATION, Tokyo (JP)

(*) Notice: Subject to any disclaimer, the term of this patent is extended or adjusted under 35 U.S.C. 154(b) by 395 days.

This patent is subject to a terminal disclaimer.

(21) Appl. No.: 17/590,996

(22) Filed: Feb. 2, 2022

(65) Prior Publication Data
US 2022/0159533 A1   May 19, 2022

Related U.S. Application Data

(63) Continuation of application No. 15/693,619, filed on Sep. 1, 2017, now Pat. No. 11,272,410, which is a (Continued)

(30) Foreign Application Priority Data

Apr. 5, 2013  (GB) ..................................... 1306216

(51) Int. Cl.
*H04W 36/04* (2009.01)
*H04W 36/08* (2009.01)
(Continued)

(52) U.S. Cl.
CPC ........... *H04W 36/04* (2013.01); *H04W 36/08* (2013.01); *H04W 84/045* (2013.01); *H04W 88/12* (2013.01); *H04W 92/045* (2013.01)

(58) Field of Classification Search
CPC ... H04W 36/04; H04W 36/08; H04W 84/045; H04W 88/12; H04W 92/045
See application file for complete search history.

(56) References Cited

U.S. PATENT DOCUMENTS

2008/0240439 A1   10/2008   Mukherjee et al. .. H04W 12/10
                                                                    380/272
2010/0124200 A1   5/2010   Ergen et al.
(Continued)

FOREIGN PATENT DOCUMENTS

EP    2424300 A1   2/2012
EP    2496017 A1   9/2012
(Continued)

OTHER PUBLICATIONS

Japanese Office Action for JP Application No. 2015-547183 mailed on Oct. 26, 2016 with English Translation.
(Continued)

*Primary Examiner* — Siren Wei
(74) *Attorney, Agent, or Firm* — Sughrue Mion, PLLC

(57) ABSTRACT

A gateway is described which facilitates a change of communication cell for a mobile device in a communication system, which includes a core network. The gateway receives messages from a base station operating a cell and forwards the messages received from the base station to the core network. The gateway intercepts a message relating to a change of communication cell, from a source cell in which the mobile communication device is located to a target cell, to determine if the core network needs to be notified of the change of cell. When it is determined that the core network needs to be notified, the gateway generates a message for providing information relating to the change of cell to the core network and transmits the message to the core network.

2 Claims, 15 Drawing Sheets

Related U.S. Application Data continuation of application No. 14/769,884, filed as application No. PCT/JP2014/059910 on Mar. 28, 2014, now abandoned.

(51) Int. Cl.
*H04W 84/04* (2009.01)
*H04W 88/12* (2009.01)
*H04W 92/04* (2009.01)

(56) References Cited

U.S. PATENT DOCUMENTS

| | | | |
|---|---|---|---|
| 2010/0238900 A1 | 9/2010 | Johansson et al. | |
| 2011/0149905 A1 | 6/2011 | Kim | H04W 36/02 370/331 |
| 2011/0256872 A1* | 10/2011 | Xu | H04W 36/08 455/436 |
| 2011/0261786 A1 | 10/2011 | Bontu et al. | |
| 2011/0266872 A1 | 11/2011 | Xu | |
| 2011/0267963 A1 | 11/2011 | Xu et al. | |
| 2011/0286429 A1 | 11/2011 | Vikberg et al. | H04W 36/0005 370/331 |
| 2011/0288429 A1 | 11/2011 | Vikberg | H04W 36/0005 370/331 |
| 2012/0001030 A1 | 1/2012 | Guttman et al. | |
| 2012/0002689 A1 | 1/2012 | Kawaguchi | |
| 2012/0076121 A1 | 3/2012 | Choi et al. | |
| 2012/0151030 A1 | 6/2012 | Guttman et al. | |
| 2012/0183336 A1 | 6/2012 | Pascal | H04W 36/0033 370/331 |
| 2012/0188984 A1* | 7/2012 | Takahashi | H04W 36/0058 370/331 |
| 2012/0244903 A1 | 9/2012 | Fong et al. | |
| 2012/0263111 A1 | 10/2012 | Mochizuki et al. | |
| 2012/0297009 A1 | 11/2012 | Amir et al. | |
| 2012/0307795 A1 | 12/2012 | Takahashi et al. | |
| 2012/0309399 A1 | 12/2012 | Wu et al. | |
| 2013/0028237 A1 | 1/2013 | Cheng | H04W 36/0016 370/331 |
| 2013/0044730 A1 | 2/2013 | Qian et al. | |
| 2013/0070731 A1 | 3/2013 | Lim et al. | |
| 2013/0150021 A1* | 6/2013 | Oh | H04W 88/12 455/422.1 |
| 2013/0307796 A1 | 11/2013 | Liu et al. | |
| 2014/0171091 A1 | 6/2014 | Cai et al. | |
| 2015/0172964 A1 | 6/2015 | Huang et al. | H04W 76/30 455/437 |
| 2015/0350969 A1* | 12/2015 | Dudda | H04W 36/0064 370/331 |
| 2015/0365872 A1 | 12/2015 | Dudda | H04W 35/305 455/436 |
| 2018/0049098 A1 | 2/2018 | Ueda | |

FOREIGN PATENT DOCUMENTS

| | | |
|---|---|---|
| EP | 2521399 A1 | 11/2012 |
| JP | 2011-041158 A | 2/2011 |
| JP | 2011-120110 A | 6/2011 |
| JP | 2012-222609 A | 11/2012 |
| JP | 2012-227974 A | 11/2012 |
| JP | 2013-061670 A | 3/2013 |
| WO | 2010059100 A1 | 5/2010 |
| WO | 2010/122712 A1 | 10/2010 |
| WO | 2011/052527 A1 | 8/2011 |
| WO | 2011/129070 A1 | 10/2011 |
| WO | 2012/135793 A2 | 10/2012 |
| WO | 2016/151653 A1 | 9/2016 |
| WO | 2017072905 A1 | 5/2017 |

OTHER PUBLICATIONS

3rd Generation Partnership Project, Technical Specification Group Radio Access Network; "Scenarios and requirements for small cell enhancements for E-UTRA and E-UTRAN (Release 12)", (Mar. 2013). 3GPP TR 36.932 V12.1.0.

3GPP TSG RAN WG1 Meeting #72 R1-130748. "Text Proposal for TR36.923 on Small Cell Enhancement Scenarios". Jan. 28-Feb. 1, 2013, Agenda Item: 7.3.5.1.

3rd Generation Partnership Project; Technical Specification Group Radio Access Network: Evolved Universal Terrestrial Radio Access (E-UTRA); "Small Cell Enhancements for E-UTRA and E-UTRAN— Higher layer aspects (Release 12)". (Feb. 2013). 3GPP TR 36.842 V0.1.0.

3rd Generation Partnership Project; Technical Specification Group Radio Access Network: Evolved Universal Terrestrial Radio Access Network (E-UTRAN); "S1 Application Protocol (S1AP)(Release 11)", (Mar. 2013), 3GPP TS 36 413 V11.3.0.

3rd Generation Partnership Project: Technical Specification Group Radio Access Network;Evolved Universal Terrestrial Radio Access (E-UTRA);Radio Resource Control (RRC);"Protocol specification (Release 11)", (Mar. 2013), 3GPP TS 38.331 V11.3.0.

CATT: "Discussion on mobility enhancements for (H)eNBs-Io-HeNBs". 3GPP Draft; R3-101878. 3rd Generation Partnership Project (3GPP), Mobile Competence Centre; 650, Route Des Luciones; F-06921 Sophia-Antipolis Cendex; France, val. RAN WG3, No. Beijing: 20100629. Jun. 23, 2010.

International Search Report for PCT Application No. PCT/JP2014/059910, mailed on Sept. 22, 2014.

Japanese Office Action for JP Application 2017-054642 mailed on May 16, 2018 with English Translation.

Japanese Office Action for JP Application No. 2017-054642 mailed on Jan. 8, 2019 with English Translation.

Japanese Office Action for JP Application No. 2017-054642 mailed on Sep. 3, 2019 with English Translation.

"X2 Application Protocol", Sep. 2012, 3GPP TS 36.423 version 11.2.0 Release 11 (Year: 2012).

* cited by examiner

COMMUNICATION SYSTEM

CROSS-REFERENCE TO RELATED APPLICATIONS

The present application is a continuation application of U.S. patent application Ser. No. 15/693,619 filed on Sep. 1, 2017, which is a continuation application of U.S. patent application Ser. No. 14/769,884 filed on Aug. 24, 2015, which is a National Stage Entry of international application PCT/JP2014/059910, filed on Mar. 28, 2014, which claims the benefit of priority from United kingdom Patent Application 1306216.1 filed on Apr. 5, 2013, the disclosures of all of which are incorporated in their entirety by reference herein.

TECHNICAL FIELD

The present invention relates to a communication system and to components thereof for providing communication services to mobile or fixed communication devices. The invention has particular but not exclusive relevance to the implementation of so-called 'small' cells or Low Power Nodes (LPNs) in Long Term Evolution (LTE) communication systems currently being developed by the 3rd Generation Partnership Project (3GPP).

BACKGROUND ART

In 3GPP LTE networks, a base station (i.e. evolved NodeB, eNB) of a Radio Access Network (RAN) transmits data and signalling between a core network (CN) and User Equipment (UEs) located within the base station's coverage area.

Recent developments in communication networks have seen increased deployment of so called 'small' cells operated by Low Power Nodes (LPNs), such as pico cNBs, femto cells. Home cNBs (HeNBs) or the like, which cells have a smaller coverage area than existing macro cells operated by a higher power macro base station. Networks comprising a number of different cell types, for example a network comprising a macro cell and it femto cell, are referred to as Heterogeneous Networks, or HetNets.

The LPNs/small cell base stations that operate small cells can typically communicate with the core network and with macro base stations by a small cell gateway ('small cell GW'). A small cell GW typically has so called home evolved nodeB gateway (HeNB-GW) functionality to provide connectivity from the LPN/small cell base station, to the core network, and X2-GW functionality effectively to provide X2 interface connectivity (albeit indirect) from the LPN/small cell base station to the macro base stations.

More recently the need to make further enhancements to small cells using low-power nodes, has been identified as one of the most important topics for further development of 3GPP standards compliant communication systems in order to enable such communication systems to cope with increases in mobile traffic especially for hotspot deployments in indoor and outdoor scenarios. According to this interest in small cell enhancements, scenarios and requirements for small cell enhancements were studied and captured in a 3GPP technical report (3GPP TR 36, 932 V12.1.0) the contents of which are herein incorporated by reference. TR 36.932 defines a low-power node as generally meaning a node whose transmit power is lower than that of macro node and base station classes. For example, as indicated above, both pico eNB and femto HeNBs are considered to be low power nodes.

Small cell enhancements for E-UTRA and E-UTRAN will focus on additional functionalities for enhanced performance in hotspot areas for indoor and outdoor using such low power nodes.

Currently, the average geographic density of macro cells is 5-7 macro cells per square kilometre. However, it is predicted that the number of small cells in urban areas will reach 40 small cells per square kilometre. The increasing geographic density of small cells presents challenges in achieving successful and efficient handover procedures in HetNets.

R1-130748, the contents of which are herein incorporated by reference, is a 3GPP text proposal for TR36.932, on 'Small Cell Enhancement Scenarios', which describes a number of scenarios for further evaluation including, for example: a scenario in which macro and small cells are provided on the same carrier frequency (intra-frequency); a scenario in which macro and small cells are provided on different carrier frequencies (inter-frequency); and a scenario in which macro cell coverage is not present, resulting in the presence of only small cells, on one or more carrier frequency.

In each scenario, the cells are considered to be connected via a non-ideal backhaul (e.g. a typical backhaul widely used in the market such as xDSL, microwave, and other backhauls like relaying) as opposed to via an ideal backhaul (e.g. a very high throughput and very low latency backhaul such as dedicated point-to-point connection using optical fiber).

3GPP technical document R2-130845, the contents of which are herein incorporated by-reference, comprises the basis for a 3GPP technical report (3GPP TR 36.842 V0.1.0) that highlights a number of issues that need resolving for each of these scenarios including, inter alia:
  a) mobility robustness;
  b) difficulties in improving system capacity by utilising radio resources in more than one base station.
  c) increased signalling load (e.g., to CN) due to frequent handover;
  d) difficulties in improving per-user throughput by utilising radio resources in more than one base station;
  e) network planning and configuration effort;

Referring, for example, to issue (c) relating to increased signalling load (e.g., to CN) due to frequent handover, handover between the small cells may comprise a so called 'S1' based handover involving S1 signalling with a mobility management entity (MME) in the core network, which MME is responsible for controlling mobility of a UE between cells (e.g. where there is no X2 connectivity between the small cells). Alternatively, handover between the small cells may comprise an 'X2' based handover involving X2 signalling with the target small cell base station and which involves S1AP path switch messages being exchanged via the core network.

In the case of the former, S1 based handover situation, for example, the following messages typically need to be exchanged for inter small cell handover involving the core network:
  S1: HO Required to MME
  S1. HO Request to another small cell
  S1: HO Request Ack from small cell to MME
  S1: HO Command from MME to small cell
  Handover Notify
  UE Context Release Command
  UE Context Release Complete And optional messages of:
eNB Status Transfer
MME Status Transfer
Location Repent Thus, MME signalling load for every handover includes at least seven messages related to the radio access network. Moreover, further signalling from a further core network entity (a serving gateway (S-GW)) is required to switch the communication tunnel with the core network (GTP tunnel) from source small cell to target small cell.

In the case of the former, X2 based handover situation, for example, MME signalling load for every handover comprises two messages and the MME will also ensure that the communication tunnel with the core network (GTP tunnel) is switched from the source cell to target cell (requiring another two messages namely an S1AP PATH SWITCH REQUEST and an S1AP PATH SWITCH REQUEST ACK message).

In the case of the scenario in which macro cell coverage is not present, whilst the absence of a macro cell may reduce interference from the macro on the same carrier as one or more of the small cells, the absence of a macro cell can also add to the complexity of addressing the issues highlighted above.

SUMMARY OF INVENTION

Accordingly, preferred exemplary embodiments of the present invention aim to provide methods and apparatus which overcome or at least alleviate the above issues.

In one aspect, the invention provides a gateway apparatus for facilitating a change of communication cell for a mobile communication device in a communication system, the gateway apparatus being operable to receive messages from at least one base station operating a respective cell of said communication system and to forward the messages received from the at least one base station to a communication entity in a core network, the gateway apparatus comprising: receiving means for receiving, from at least one of a source base station that operates a source cell in which said mobile communication device is located and a target base station that operates a target cell for said change of communication cell, at least one message relating to said change of communication cell, means for intercepting and processing said message relating to said change of communication cell to determine if said communication entity in the core network needs to be notified of information relating to said change of communication cell; generating means for generating, when it is determined that said communication entity in the core network needs to be notified of information relating to said change of communication cell, a message for providing said information relating to said change of communication cell to said core network entity; and transmitting means for transmitting, to said communication entity in the core network, said message for providing said information relating to said change of communication cell.

The means for intercepting and processing may be operable to determine whether or not said message relating to said change of communication cell should be forwarded to said communication entity in the core network.

The means for intercepting and processing may be operable to determine whether messages relating to a change of communication cell should be for warded to said communication entity in the core network based on a number of cell changes that have occurred since messages relating to a change of communication cell were previously forwarded to said communication entity in the core network. In this case, the means for intercepting and processing may be operable to determine that messages relating to a change of communication cell should not be forwarded to said communication entity in the core network when the number of cell changes that have occurred since messages relating to a change of communication cell were previously forwarded to said communication entity in the core network has not exceeded a predetermined value. The means for intercepting and processing may also be operable to determine that messages relating to a change of communication cell should be forwarded to said communication entity in the core network when the number of cell changes that have occurred since messages relating to a change of communication cell were previously forwarded to said communication entity in the core network has reached or exceeded the predetermined value.

The generating means may be operable to generate, responsive to said message relating to said change of communication cell, a further message for progressing said change of communication cell; and said transmitting means may be operable to transmit said further message for progressing said change of communication cell to said source base station or to said target base station. In this case, the generating means may be operable to generate said further message for progressing said change of communication cell without forwarding the message relating to said change of communication cell to the communication entity in the core network. The generating means may be operable to generate said further message for progressing said change of communication cell based on information obtained by said means for intercepting and processing from messages previously forwarded to or from said communication entity in said core network.

The means for intercepting and processing may be operable to determine if said communication entity in the core network needs to be notified of information relating to said change of communication cell comprising location information. In this case, the message for providing said information relating to said change of communication cell to said communication entity in the core network may comprise a location report for providing said location information.

The means for intercepting and processing may be operable to determine if said communication entity in the core network needs to be notified of information relating to said change of communication cell comprising information identifying communication bearers that the target base station has failed to set up. In this case, the message for providing said information relating to said change of communication cell to said communication entity in the core network may comprise a message identifying said communication bearers that the target base station has failed to set up.

The receiving means may be operable to receive, from said communication entity in the core network in response to said message identifying said communication bearers that the target base station has failed to set up, a message for initiating a modification in a communication parameter for communication by said mobile communication device in said target cell. In this case, the message for initiating a modification in a communication parameter may be configured to initiate a change in an aggregate maximum bit rate.

The means for intercepting and processing may be operable to determine, from a message relating to said change of communication cell received from said source base station, whether direct data forwarding is possible for at least one communication bearer of said mobile communication device. In this case, the generating means may be operable to generate, responsive to said determination of whether direct data forwarding is possible, a message indicating whether direct data forwarding is possible for sending to said target base station.

The generating means may be operable to generate, responsive to a determination that direct data forwarding is possible, a message comprising parameters for establishing a direct communication tunnel for forwarding data directly between said source and target base stations.

The gateway apparatus may be operable, responsive to a determination that direct data forwarding is not possible, to facilitate establishment of an indirect communication tunnel for forwarding data indirectly between said source and target base stations via said gateway apparatus. The gateway apparatus may also be operable to facilitate said establishment of an indirect communication tunnel using a tunnel creation request (e.g. a Create Indirect Data Forwarding Tunnel Request message) and a corresponding response message (e.g. a Create Indirect Data Forwarding Tunnel Response message).

The gateway apparatus may be operable to terminate messages related to said change of communication cell, received from said source base station or from said target base station and destined for said communication entity in the core network, without forwarding them to said communication entity in the core network.

The gateway apparatus may be a small cell gateway apparatus. The gateway apparatus may comprise at least one of a home base station gateway (HeNB-GW) function, a security gateway (SeGW), and an X2 gateway (X2-GW) function. The communication entity in the core network may be a mobility management entity (MME). The base station may comprise a low power node (LPN) operating a small cell (e.g. a pico, femto or micro cell). The at least one message relating to said change of communication cell may be a message in accordance with the S1 application protocol (S1AP).

In another aspect, the invention provides a gateway apparatus for facilitating a change of communication cell for a mobile communication device in a communication system, the gateway apparatus comprising: means for storing, at the gateway apparatus, context information for the mobile communication device relating to a communications connection between the mobile communication device and a source base station that operates a source cell in which said mobile communication device is located, means for receiving, from at least one of a source base station that operates a source cell in which said mobile communication device is located and a target base station that operates a target cell for said change of communication cell, at least one message relating to said change of communication cell; means for generating at least one further message for progressing said change of communication cell responsive to said at least one message relating to said change of communication cell using said context information; and means for transmitting, to at least one of said source base station and said target base station, said at least one further message for progressing said change of communication cell.

In this case, the at least one further message for progressing said change of communication cell may comprise a message for transferring said context information to said target base station. The context information may comprise security context information relating to the communications connection between the mobile communication device and the source base station (e.g. including at least one security key). The gateway apparatus may be operable to determine whether or not to initiate the transfer of said context information, including said security context information, based on a number of cell changes that have occurred since the security context information was last updated. The gateway apparatus may be operable to determine to initiate the transfer of said context information, including said security context information, when the number of cell changes that have occurred since the security context information was last updated has not exceeded a predetermined value.

The gateway apparatus may be operable to determine not to initiate the transfer of said context information, including said security context information, when the number of cell changes that have occurred since the security context information was last updated has reached or exceeded said predetermined value. In this case, the gateway apparatus may be operable to initiate an update to said security context information when the number of cell changes that have occurred since the security context information was last updated has reached or exceeded said predetermined value.

In yet another aspect, the invention provides a gateway apparatus for facilitating a change of communication cell for a mobile communication device in a communication system, the gateway apparatus being operable to receive messages from at least one base station operating a respective cell of said communication system and to forward the messages received from the at least one base station to a communication entity in a core network, the gateway apparatus comprising means for receiving, from at least one of a source base station that operates a source cell in which said mobile communication device is located and a target base station that operates a target cell for said change of communication cell, at least one message relating to said change of communication cell; means for intercepting and processing said message relating to said change of communication cell to determine whether said message relating to a change of communication cell should be forwarded to said communication entity in the core network based on a number of cell changes that have occurred since messages relating to a change of communication cell were previously forwarded to said communication entity in the core network; means for generating, when it is determined that said message relating to a change of communication cell should not be forwarded to said communication entity in the core network, a further message for progressing said change of communication cell; means for transmitting, when it is determined that said message relating to a change of communication cell should not be forwarded to said communication entity in the core network, to said source base station or to said target base station, said further message for progressing said change of communication cell; and means for forwarding said message relating to a change of communication cell to said communication entity in the core network, when it is determined that said message relating to a change of communication cell should be forwarded to said communication entity in the core network.

In a further aspect, the invention provides a gateway apparatus for facilitating a change of communication cell for a mobile communication device in a communication system, the gateway apparatus being operable to receive messages from at least one base station operating a respective cell of said communication system and to forward the messages received from the at least one base station to a communication entity in a core network, the gateway apparatus comprising, means for receiving, from at least one of a source base station that operates a source cell in which said mobile communication des ice is located and a target base station that operates a target cell for said change of communication cell, at least one message relating to said change of communication cell; means for intercepting and processing said message relating to said change of communication cell to determine, from a message relating to said change of communication cell received from said source base station, whether direct data forwarding is possible for at least one communication bearer of said mobile communication device; means for generating, responsive to said determination of whether direct data forwarding is possible, a message indicating whether direct data forwarding is possible for sending to said target base station; and means for transmitting, said message indicating whether direct data forwarding is possible to said target base station.

In another aspect, the invention provides a gateway apparatus for facilitating a change of communication cell for a mobile communication device in a communication system, the gateway apparatus being operable to receive messages from at least one base station operating a respective cell of said communication system and to forward the messages received from the at least one base station to a communication entity in a core network, the gateway apparatus comprising a processor and transceiver circuitry, wherein; said transceiver circuitry is configured to receive, from at least, one of a source base station that operates a source cell in which said mobile communication device is located and a target base station that operates a target cell for said change of communication cell, at least one message relating to said change of communication cell; said processor is configured to: i) intercept and process said message relating to said change of communication cell to determine if said core network entity needs to be notified of information relating to said change of communication cell; and ii) generate, when it is determined that said communication entity in the core network needs to be notified of information relating to said change of communication cell, a message for providing said information relating to said change of communication cell to said communication entity in the core network, and said transceiver circuitry is configured to transmit, to said communication entity in the core network, said message for providing said information relating to said change of communication cell.

In another aspect, the invention provides a gateway apparatus for facilitating a change of communication cell for a mobile communication device in a communication system, the gateway apparatus comprising a processor, a memory, and transceiver circuitry, wherein said processor is configured to store in said memory context information for the mobile communication device relating to a communications connection between the mobile communication device and a source base station that operates a source cell in which said mobile communication device is located; said transceiver circuitry is configured to receive, from at least one of a source base station that operates a source cell in which said mobile communication device is located and a target base station that operates a target cell for said change of communication cell, at least one message relating to said change of communication cell; said processor is configured to generate at least one further message for progressing said change of communication cell responsive to said at least one message relating to said change of communication cell using said context information, and said transceiver circuitry is configured to transmit, to at least one of said source base station and said target base station, said at least one further message for progressing said change of communication cell.

In another aspect, the invention provides a gateway apparatus for facilitating a change of communication cell for a mobile communication device in a communication system, the gateway apparatus being operable to receive messages from at least one base station operating a respective cell of said communication system and to forward the messages received from the at least one base station to a communication entity in a core network, the gateway apparatus comprising a processor and transceiver circuitry, wherein, said transceiver circuitry is configured to receive, from at least one of a source base station that operates a source cell in which said mobile communication device is located and a target base station that operates a target cell for said change of communication cell, at least one message relating to said change of communication cell.

said processor is configured to: i) intercept and process said message relating to said change of communication cell to determine whether said message relating to a change of communication cell should be forwarded to said communication entity in the core network based on a number of cell changes that have occurred since messages relating to a change of communication cell were previously forwarded to said communication entity in the core network; and ii) generate, when it is determined that said message relating to a change of communication cell should not be forwarded to said communication entity in the core network, a further message for progressing said change of communication cell; means for transmitting, when it is determined that said message relating to a change of communication cell should not be forwarded to said communication entity in the core network, to said source base station or to said target base station, said further message for progressing said change of communication cell; and said transceiver circuitry is configured to forward said message relating to a change of communication cell to said communication entity in the core network, when it is determined that said message relating to a change of communication cell should be forwarded to said communication entity in the core network.

In another aspect, the invention provides a gateway apparatus for facilitating a change of communication cell for a mobile communication device in a communication system, the gateway apparatus being operable to receive messages from at least one base station operating a respective cell of said communication system and to forward the messages received from the at least one base station to a communication entity in a core network, the gateway apparatus comprising a processor and transceiver circuitry, wherein, said transceiver circuitry is configured to receive, from at least one of a source base station that operates a source cell in which said mobile communication device is located and a target base station that operates a target cell for said change of communication cell, at least one message relating to said change of communication cell, said processor is configured to: i) intercept and process said message relating to said change of communication cell to determine, front a message relating to said change of communication cell received from said source base station, whether direct data forwarding is possible for at least one communication bearer of said mobile communication device; and ii) generate, responsive to said determination of whether direct data forwarding is possible, a message indicating whether direct data forwarding is possible for sending to said target base station, and said transceiver circuitry is configured to transmit, said message indicating whether direct data forwarding is possible to said target base station.

The invention also provides a communication system comprising the above described gateway apparatus, at least one mobile communication device, a source base station and a target base station.

In another aspect, the invention provides a method performed by a gateway apparatus for facilitating a change of communication cell for a mobile communication device in a communication system, the gateway apparatus being operable to receive messages from at least one base station operating a respective cell of said communication system and to forward the messages received from the at least one base station to a communication entity in a core network, the method comprising receiving, from at least one of a source base station that operates a source cell in which said mobile communication device is located and a target base station that operates a target cell for said change of communication cell, at least one message relating to said change of communication cell, intercepting and processing said message relating to said change of communication cell to determine if said communication entity in the core network needs to be notified of information relating to said change of communication cell; generating, when it is determined that said communication entity in the core network needs to be notified of information relating to said change of communication cell, a message for providing said information relating to said change of communication cell to said communication entity in the core network, and transmitting, to said communication entity in the core network, said message for providing said information relating to said change of communication cell.

In another aspect, the invention provides a method performed by a gateway apparatus for facilitating a change of communication cell for a mobile communication device in a communication system, the method comprising: storing, at the gateway apparatus, context information for the mobile communication device relating to a communications connection between the mobile communication device and a source base station that operates a source cell in which said mobile communication device is located; receiving, from at least one of a source base station that operates a source cell in which said mobile communication device is located and a target base station that operates a target cell for said change of communication cell, at least one message relating to said change of communication cell; generating at least one further message for progressing said change of communication cell responsive to said at least one message relating to said change of communication cell using said context information; and transmitting, to at least one of said source base station and said target base station, said at least one further message for progressing said change of communication cell.

In another aspect, the invention provides a method performed by a gateway apparatus for facilitating a change of communication cell for a mobile communication device in a communication system, the gateway apparatus being operable to receive messages from at least one base station operating a respective cell of said communication system and to forward the messages received from the at least one base station to a communication entity in a core network, the method comprising: receiving, from at least one of a source base station that operates a source cell in which said mobile communication device is located and a target base station that operates a target cell for said change of communication cell, at least one message relating to said change of communication cell, intercepting and processing said message relating to said change of communication cell to determine whether said message relating to a change of communication cell should be forwarded to said communication entity in the core network based on a number of cell changes that have occurred since messages relating to a change of communication cell were previously forwarded to said communication entity in the core network, generating, when it is determined that said message relating to a change of communication cell should not be forwarded to said communication entity in the core network, a further message for progressing said change of communication cell, transmitting, when it is determined that said message relating to a change of communication cell should not be forwarded to said communication entity in the core network, to said source base station or to said target base station, said further message for progressing said change of communication cell, and forwarding said message relating to a change of communication cell to said communication entity in the core network, when it is determined that said message relating to a change of communication cell should be forwarded to said communication entity in the core network.

In another aspect, the invention provides a method performed by a gateway apparatus for facilitating a change of communication cell for a mobile communication device in a communication system, the gateway apparatus being operable to receive messages from at least one base station operating a respective cell of said communication system and to forward the messages received from the at least one base station to a communication entity in a core network, the method comprising: receiving, from at least one of a source base station that operates a source cell in which said mobile communication device is located and a target base station that operates a target cell for said change of communication cell, at least one message relating to said change of communication cell; intercepting and processing said message relating to said change of communication cell to determine, from a message relating to said change of communication cell received from said source base station, whether direct data forwarding is possible for at least one communication bearer of said mobile communication device, generating, responsive to said determination of whether direct data forwarding is possible, a message indicating whether direct data forwarding is possible for sending to said target base station; and transmitting, said message indicating whether direct data forwarding is possible to said target base station.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Although for efficiency of understanding for those of skill in the art, the invention will be described in detail in the context of a 3G system (UMTS, LTE), the principles of the invention can be applied to other systems (such as WiMAX) in which (home) base stations communicate via a signalling gateway with the corresponding elements of the system changed as required.

BRIEF DESCRIPTION OF DRAWINGS

Exemplary embodiments of the invention will now be described, by way of example, with reference to the accompanying drawings in which.

MODE FOR CARRYING OUT THE INVENTION

Overview

Figure 1:
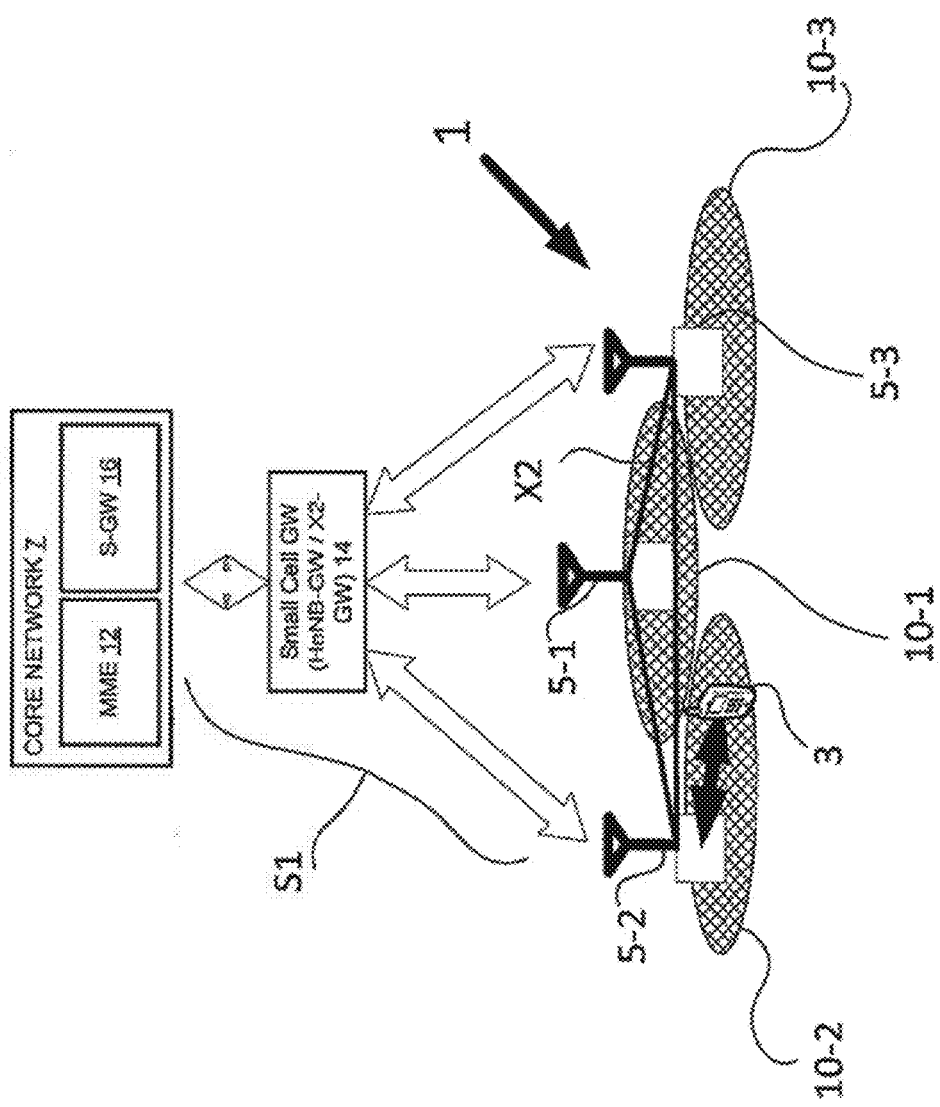
FIG. 1 schematically illustrates a mobile telecommunication system of a type to which the invention is applicable.
Figure 2:
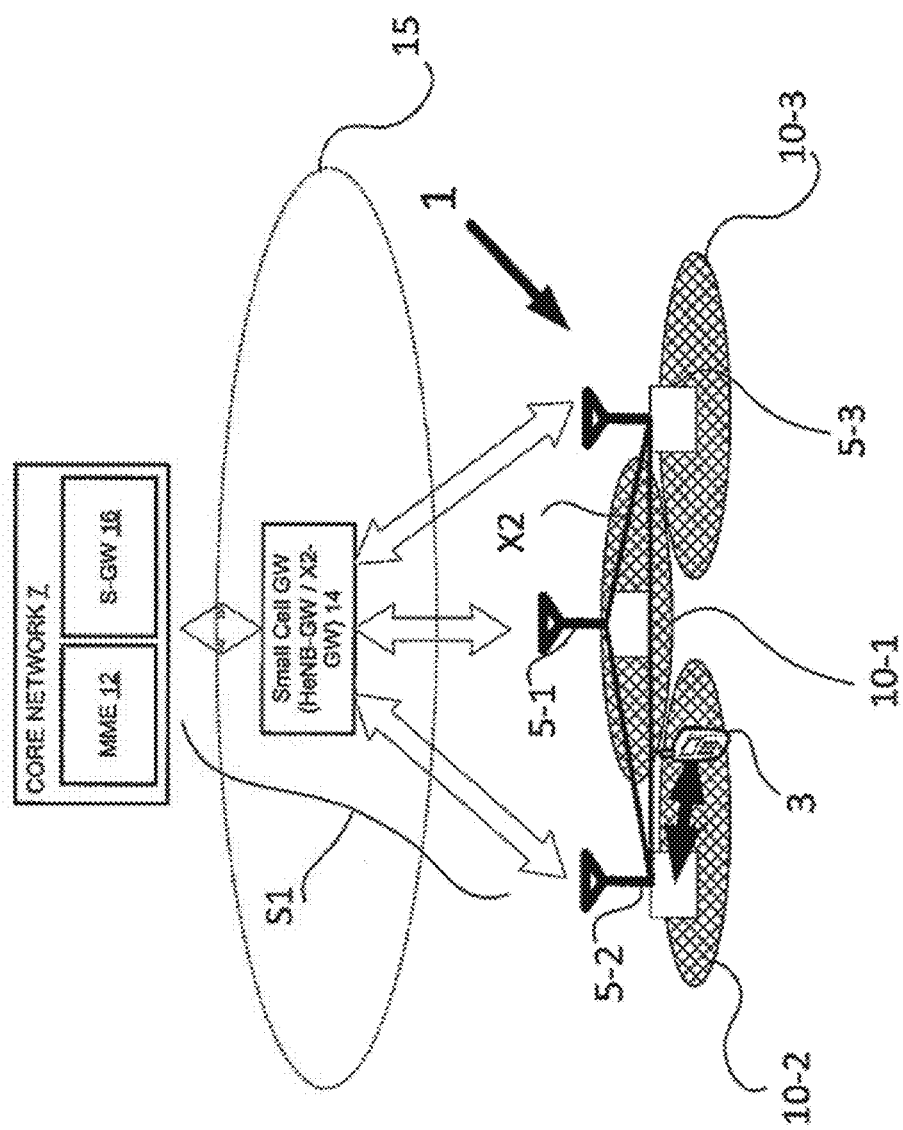
FIG. 2 schematically illustrates a mobile telecommunication system of another type to which the invention is applicable.

FIGS. 1 and 2 each schematically illustrates a mobile (cellular) telecommunication system 1 including a mobile communication device 3 comprising a mobile telephone (or other compatible user equipment) and a plurality of small cell base stations 5-1 to 5-3 (which may be any suitable small cell base station for example, Home evolved NodeBs (HeNBs), pico or femto base stations or the like) but which may beany suitable small cell base station) each of which operates an associated small cell 10-1 to 10-3 arranged in a cluster.

Each base station 5 is coupled to a core network 7 via a small cell gateway 14 and the core network 7 is also coupled to other networks (e.g. the Internet) via one or mote gateways (not shown). The core network 7 includes a mobility management entity (MME) 12, a serving gateway (S-GW) 16 (and other communication entities such as a Packet Data Network (PDN) Gateway (PGW), which have also been omitted for sake of simplicity). The mobile communication device 3 is served via a small cell 10-2 operated by one of the base stations 5-2.

The backhaul from the base stations 5 to the core network 7 is considered to be non-ideal (e.g. comprising a typical backhaul such as xDSL or microwave). Further, in the arrangement of cells shown in FIG. 1 there is no macro cell, within the vicinity, which the mobile communication device 3 can connect to or can receive information (such as system information) or reference signals from. Accordingly, this conforms with the scenario, described in R1-130748, in which macro cell coverage is not present, resulting in the presence of only small cells, on one or more carrier frequency.

Communication between the base stations 5 and the MME 12 is via a so-called 'S1' interface. An 'X2' interface is also provided for communication between neighbouring base stations 5 to facilitate data exchange between them. As those skilled in the art will appreciate whilst one mobile communication device 3 and three base stations 5 are shown in FIG. 1 for illustration purposes, additional user equipment and/or base stations may be present in a deployed system. As illustrated, the mobile communication device 3 is located within cell 10-2, and base station 5-2 acts as a serving cell for the mobile communication device 3. Connection of the mobile communication device 3 with a serving base station 5-2 allows the mobile communication device 3 to perform communication actions such as registering with the network, updating its registration, and establishing a data session or a voice call.

However, when the mobile communication device 3 approaches the edge of cell 10-2, or when the signal conditions within this cell begin to deteriorate, for example due to path loss, physical environment or power limitation, it becomes necessary for the mobile communication device 3 to handover to another cell, such as cell 10-1 or 10-3, or any other suitable cell.

Further reasons for handover becoming necessary may include, for example, the presence of regions w here the signals from the serving base station 5-2 cannot be decoded by the mobile communication device 3. Also, in uplink, because a base station may communicate with many mobile communication dev ices, its resources may become limited or insufficient. Such limited cell coverage or lack of base station resources results in fewer services for users and on-going communication/applications may suffer, for example experiencing increased latency.

The serving base station 5-2 receives information from the mobile communication device 3 which it uses to determine when handover becomes necessary for the mobile communication device 3, and to identify a plurality of suitable candidate target cells. The information received by the base station 5-2 could be any information measured by the mobile communication device 3 or information deduced from the measurements performed by the mobile communication device 3.

The mobile communication device 3 is therefore configured (by or via base station 5-2) to perform signal measurements with respect to its neighbouring cells and/or serving cell and to report the results based on these measurements when certain predetermined signal conditions are met.

The small cell base stations 5 and MME 12 are operable in accordance with the so-called S1 application protocol (S1AP) in accordance with 3GPP TS 36.413 V11.3.0 the contents of which are herein incorporated by reference. S1AP provides the signalling service between the small base stations 5 of the E-UTRAN and the evolved packet core (EPC) that is required to fulfil a number of S1AP functions including, inter alia:

Evolved Radio Access Bearer (E-RAB) management functions for setting up, modifying and releasing E-RABs, which are triggered by the MME 12. The release of E-RABs may be triggered by the base station 5 as well.

Initial Context Transfer functions to establish an S1 context for the mobile communication device 3 in the base station 5, to setup the default IP connectivity, to setup one or more E-RAB(s) if requested by the MME 12, and to transfer non-access stratum (NAS) signalling related information to the base station 5 if needed.

UE Capability Information Indication functions to provide the capability information for the mobile communication device 3, when received from the mobile communication device 3 to the MME 12.

Mobility Functions for mobile communication devices 3 operating in an active mode to enable a change of base station via the S1 interface and/or a change of radio access network (RAN) nodes between different radio access technologies (RATs) via the S1 interface.

Paging functionality which allows the EPC the capability to page the mobile communication device 3.

S1 interface management functions including reset functionality to ensure a well defined initialisation on the S1 interface, error Indication functionality to allow a proper error reporting/handling in cases where no failure messages are defined: an overload function to indicate the load situation in the control plane of the S1 interface; a load balancing function to ensure equally loaded MMEs 12 within an MME pool area; S1 setup functionality for initial S1 interface setup for providing configuration information, base station 5 and MME 12 configuration update functions are to update application level configuration data needed for the base station 5 and MME 12 to interoperate correctly on the S1 interface.

Non-Access Stratum (NAS) signalling transport functionality between the mobile communication device 3 and the MME 12: to transfer NAS signalling related information and to establish the S1 context for the mobile communication device 3 in the base station 5, to transfer NAS signalling related information when the S1 context for the mobile communication device 3 in the base station 5 is already established.

S1 UE context release functionality to manage the release of a mobile communication device specific context in the base station 5 and the MME 12.

UE context modification functionality to modify the established context for the mobile communication device 3 partly.

Status transfer functionality for transferring Packet Data Convergence Protocol (PDCP) Sequence Number (SN) status information from a source base station to a target base station in support of in-sequence delivery of data and duplication avoidance for intra LTE handover.

Location reporting functionality to allow the MME 12 to be aware of the mobile communication devices current location.

The small cell gateway 14 is provided both: with conventional HeNB-GW functionality for receiving and forwarding S1 signalling between the base station 5 and the MME 12; and with X2-GW functionality for receiving and forwarding X2 signalling between base stations.

Beneficially, in one exemplary embodiment (as illustrated in FIG. 1), S1 mobility related signalling for the purposes of handover is terminated in the small cell gateway 14 as opposed to the MME 12 as is conventionally the case, thereby avoiding additional signalling with the core network 7.

Specifically, the small cell gateway 14 is able to receive S1 signalling, from the base station 5-2 of a source small cell 10-2, that indicates that handover is required. The small cell gateway 14 is, advantageously, able to determine, based on this S1 signalling, without involving the core network 7 (e.g. without involving the MME 12), that handover is required. Further, the small cell gateway 14 is able to generate, when it is determined that handover is required, appropriate S1 signalling for communicating with the base stations 5 of a target cell (e.g. cell 10-1 or cell 10-3) and the source cell 10-2, (and for receiving associated response signalling from the respective base stations 5 of the target cell (e.g. cell 10-1 or cell 10-3) and the source cell 10-2) in pursuit of handover of the mobile communication device 3 from the source small cell 5-2, to the target small cell (e.g. cell 10-1 or cell 10-3) without additional, unnecessary signalling directed to the MME 12.

It is noted, however, that termination of handover signalling in the small cell gateway 14 does not, by itself, provide the flexibility to handle some more complex situations that may become increasingly prevalent as small cell scenarios become more ubiquitous.

In this exemplary embodiment, greater flexibility is beneficially provided, by allowing some communication between the small cell gateway 14 and the core network 7 even where handover is terminated at the small cell gateway 14.

Advantageously, for example, greater flexibility is beneficially provided by having the small cell gateway 14 monitor whether set up of any communication bearers supported at the source small cell base station 5-2 has failed at the target base station 5-1 or 5-3. If set up of any communication bearers supported at the source small cell base station has failed at the target base station 5-1 or 5-3, then the small cell gateway 14 communicates with the MME 12, and the target small cell base station 5-1 or 5-3 in order to initiate an appropriate change in the aggregate maximum bit rate for the mobile communication device 3.

The aggregate maximum bit rate (UE-AMBR) limits the aggregate bit rate that can be expected to be provided across all non-guaranteed bit rate (non-GBR) bearers for a mobile communication device. Accordingly, updating the UE-AMBR as described above allows for better utilisation of the resources, when communication bearers are rejected, because it allows the UE-AMBR to be dynamically reduced so that resources can be allocated to other mobile communication devices.

Moreover, in this exemplary embodiment, greater flexibility is beneficially provided by having the small cell gateway 14 monitor whether location reporting is required, when there is a change in the serving cell, to store an indicator that the location reporting is required in response to a change in the serving cell, and to generate a location report and send it to the core network 7 accordingly. Hence, the core network 7 is advantageously able to maintain is ability to keep track of the mobile communication device's location, when required, in response to the change of cell despite other S1 signalling being terminated in the small cell gateway 14

This exemplary embodiment also provides greater flexibility by providing a mechanism for supporting both direct and indirect forwarding of downlink data from the source cell 10-2 to the target cell 10-1, 10-3 during handover in order to avoid, or at least mitigate, potential loss of downlink data. This mechanism involves the small cell gateway 14 receiving an indication, from the source cell base station 5-2, as to whether direct data forwarding is supported or not and then providing a corresponding indication to the target cell base station 5-1, 5-3. In the case of direct forwarding, the downlink data can then be forwarded directly from the source cell base station 5-2 to the target cell base station 5-1, 5-3 without further involvement of the small cell gateway 14 in the data forwarding process. In the case of indirect forwarding, the small cell gateway 14 manages the setup anti configuration of a communication tunnel for forwarding the downlink data from the source cell base station 5-2 to the target cell base station 5-1, 5-2.

It will be appreciated that although this exemplary embodiment has been introduced with reference to S1 interface based handover a similar approach can also be applied for signalling, during an X2 based handover, directed towards the core network (e.g. the MME/Se-GW). One difference, compared to the S1 based handover wilt, of course, be the presence of X2-GW assisting in X2 signalling between small cells in pursuance of the handover.

Beneficially, in another exemplary embodiment (as illustrated in FIG. 2), instead of terminating S1 signalling in the small cell gateway 14 in the manner introduced above, the small cell gateway is operable to provide 'virtual' dual connectivity in which the mobile communication device 3 can have simultaneous 'connectivity' to two cells a secondary cell (SCell) which, in this exemplary embodiment, is the small cell 10-2 operated by the small cell base station 5-2 via which the mobile communication device 3 is connected to the network, and a 'virtual' primary cell (PCell) 15 which appears, to the mobile communication device 3, to be a 'virtual macro cell' via which the small cell is connected to the network.

Specifically, the 'virtual' dual connectivity is implemented by storing a 'virtual macro cell' context in the small cell gateway 14. The mobile communication device 3 is, effectively, provided with a 'virtual' association to the 'virtual macro cell' 15 but does not have a physical association.

Accordingly, since the source small cell 10-2 is in the effective coverage of the 'virtual' macro cell 15, a dual connection can be used for handover in order to simplify the inter-node signalling exchange. Thus, when small cell to small cell handover occurs this is dealt with at the small cell gateway 14 and no signalling is required towards the core network 7.

Mobile Communication Device

Figure 3:
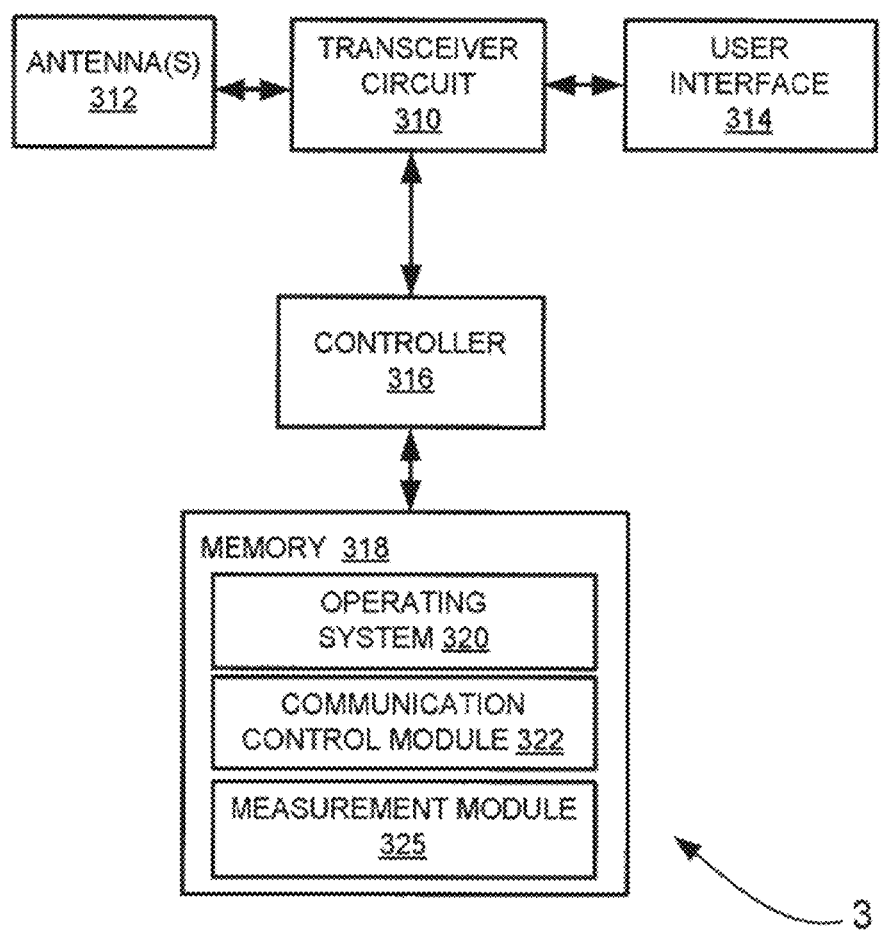
FIG. 3 is a block diagram illustrating the main components of a mobile communication device forming part of the system shown in FIG. 1 or FIG. 2.

FIG. 3 is a block diagram illustrating the main components of the mobile communication device 3 shown in FIGS. 1 and 2. As shown, the mobile communication device 3 includes a transceiver circuit 310 which is operable to transmit signals to, and to receive signals from, the base station 5 and/or other mobile communication devices (not illustrated in FIG. 1) via at least one antenna 312. The mobile communication device 3 may of course have all the usual functionalities of a conventional mobile communication device (such as a user interface 314 which may comprise input and output devices such as microphones, touch screen, keypad, speaker and/or the like) and this may be provided by any combination of hardware, software and firmware, as appropriate. The operation of the transceiver circuit 310 is controlled by a controller 316 in accordance with software stored in memory 318. The software includes, among other things, an operating system 318, a communication control module 322 and a measurement module 325.

The communication control module 322 is operable to handle (e.g. generate, send and receive) control signals for controlling the connections between the mobile communication device 3 and other user equipment or various net work nodes, such as the serving base station 5-2.

The measurement module 325 is operable to perform desired signal measurements (e.g. CRS or CSI-RS measurements), to determine associated signal quality values (e.g. RSRP and RSRQ) and to generate and send associated measurement reports as appropriate under the control of the communication control module 322.

Base Station

Figure 4:
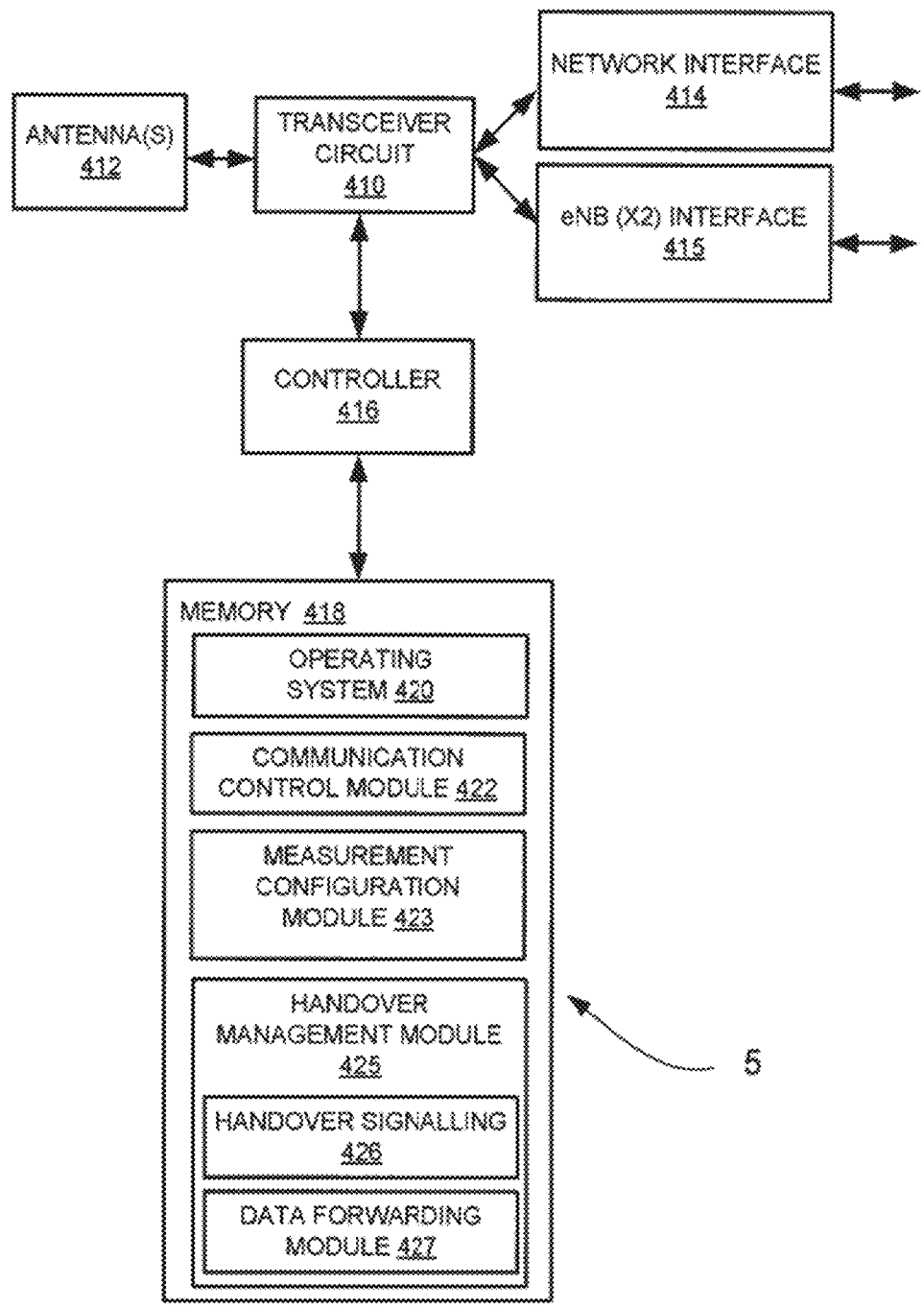
FIG. 4 is a block diagram illustrating the main components of abase station forming part of the system shown in FIG. 1 or FIG. 2.

FIG. 4 is a block diagram illustrating the main components of one of the small cell base stations 5 shown in FIGS. 1 and 2, such as serving base station 5-2. As shown, the base station 5 includes a transceiver circuit 410 which is operable to transmit signals to, and to receive signals from, the mobile communication device 3 via at least one antenna 412. The base star ism 5 is also operable to transmit signals to and to receive signals from nodes in the core network 7 (such as the MME 12 or the S-GW 16), via the small cell gateway 14, using network interface 414 which comprises tire S1 interface. The base station 5 is also operable to transmit signals to and to receive signals from other base stations (macro or small) either using the functionality of the small cell gateway 14 or via a dedicated eNB (X2) interface 415. The operation of the transceiver circuit 410 is controlled by a controller 416 in accordance with software stored in memory 418. The software includes, among other things, an operating system 420, a communication control module 422, a measurement configuration module 423, and a handover management module 425 comprising a handover signalling module 426 and a data forwarding module 427.

The communication control module 422 is operable to control communications between the base station 5 and the mobile communication device 3, between the base station 5 and the network devices such as the MME 12, SGW 16 via the small cell gateway 14, and between the base station 5 and other base stations via the X2 interface 415 or via the X2-GW functionality of the small cell gateway 14.

The measurement configuration module 423 is operable to configure the mobile communication device 3 to perform required signal measurements (for example CRS or CSI-RS measurements) and to sending associated information in a measurement report as appropriate (e.g. in response to a specific event).

The handover management module 425 is operable to manage aspects of handover procedures performed at the base station 5 including generation and transmission of appropriate handover signalling by the handover signalling module 426 and managing the forwarding of downlink data via the data forwarding module 427.

Small Cell Gateway

Figure 5:
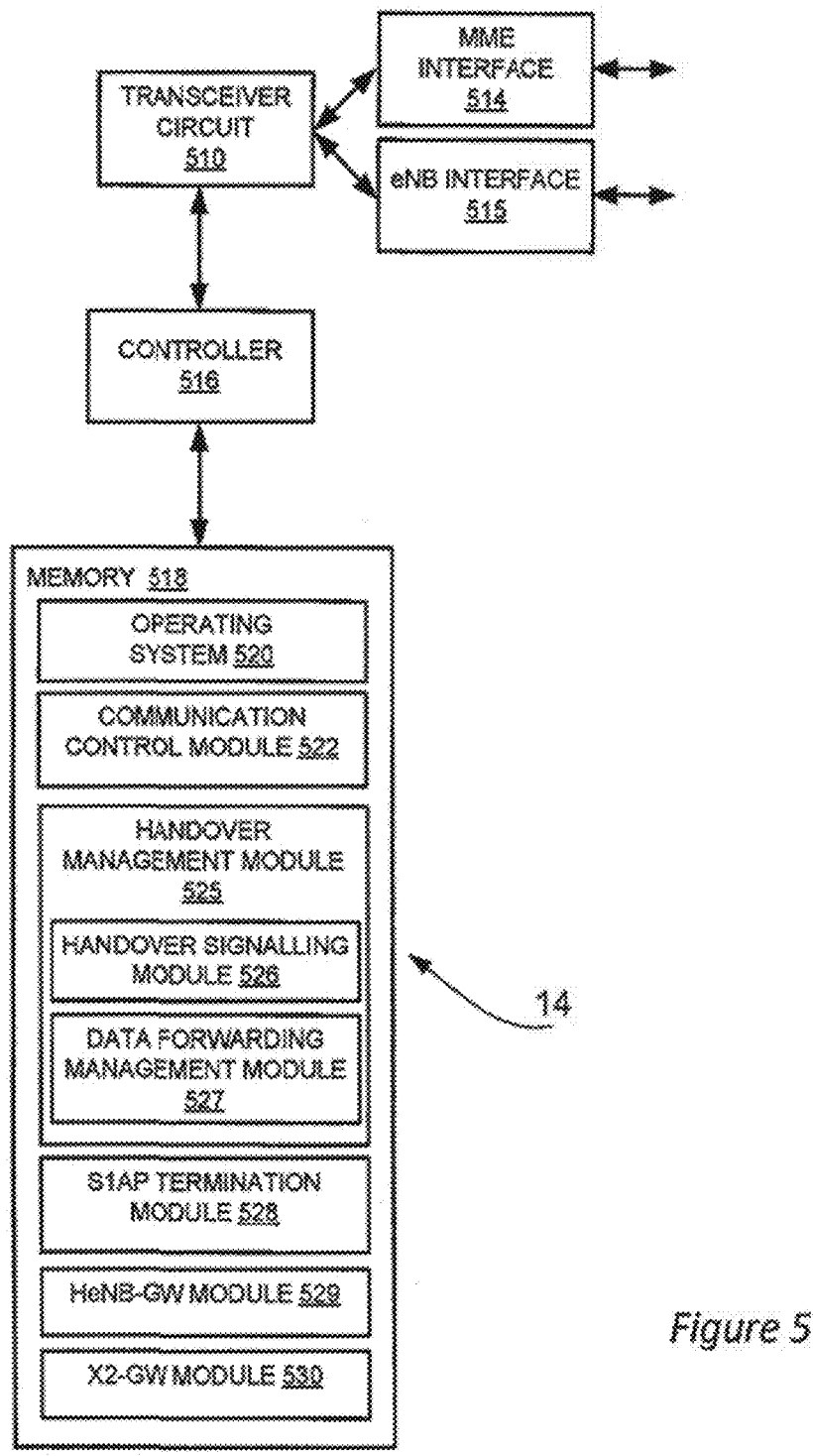
FIG. 5 is a block diagram illustrating the main components of a small cell gateway forming part of the system forming part of the system shown in FIG. 1 or FIG. 2.

FIG. 5 is a block diagram illustrating the main components of the small cell gateway 14 shown in FIGS. 1 and 2. As shown, the small cell gateway 14 includes a transceiver circuit 510 which is operable to transmit signals to, and to receive signals from, nodes in the core network 7 (such as the MME 12 or the SGW 16), via an associated network interface 514 comprising the S1 interface. The small cell gateway 14 is also operable to transmit signals to and to receive signals from base stations 5 via an eNB interface 515 including both an S1 and X2 interface. The operation of the transceiver circuit 510 is controlled by a controller 516 in accordance with sort ware stored in memory 518. The software includes, among other things, an operating system 520, a communication control module 522, a handover management module 525 comprising a handover signalling module 526 and a data forwarding module 527, an S1AP termination module 528, an HeNB-GW module 529 and X2-GW module 530.

The communication control module 522 is operable to control communications between the small cell gateway 14 and the base stations via the eNB interface 515 and between the small cell gateway 14 and network devices such as the MME 12 and SGW 16 via the network interface 514.

The handover management module 525 is operable to manage aspects of handover procedures performed at the small cell gateway 14 including generation and transmission of appropriate handover signalling by the handover signalling module 526 and managing the forwarding of downlink data via the data forwarding management module 527.

The S1AP termination module 528 provides S1AP functionality at the small cell gateway thereby allowing the small cell gateway to terminate S1 signalling at the small cell gateway (e.g. for implementing the embodiment in which S1 signalling is terminated at the gateway), and in particular handover related signalling. The S1AP functionality includes the ability to process S1 messages received from the base station 5 and to generate appropriate S1 response messages without the involvement of the core network. It will be appreciated that although this module may not be necessary for the exemplary embodiment of FIG. 5 it may, nevertheless, be present to allow the flexibility to terminate of signalling if required.

The HeNB-GW module 529 provides the HeNB-GW functionality to allow the small cell gateway to continue to act as an intermediary between the base station 5 and the core network 7 (e.g. for S1 signalling that is not terminated at the small cell gateway 14 such as the exemplary embodiment in which S1 signalling is not terminated at the gateway) and the X2-GW module 530 provides the X2-GW functionality to allow the small cell gateway to act as an intermediary between the base station 5 and other base stations for X2 based signalling.

In the above description, the mobile communication device 3, the base station 5 and the small cell gateway 14 are each described for ease of understanding as having a number of discrete modules (such as the communications control modules, the reporting module, and the handover command module). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Operation—Normal Handover

Figure 6:
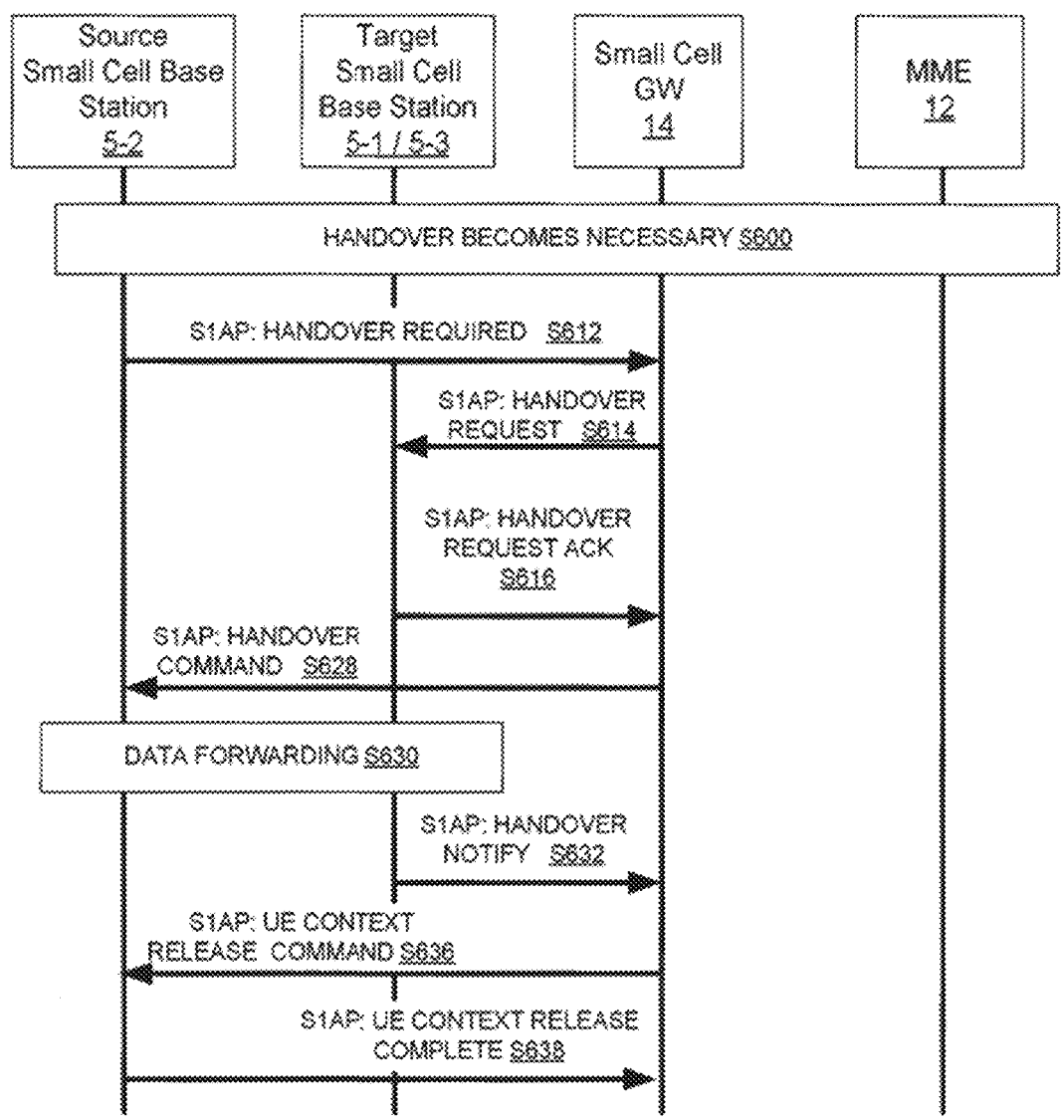
FIG. 6 is an exemplary timing diagram illustrating a method performed by components of the mobile telecommunication system of FIG. 1 whilst carrying out an embodiment of the invention.

FIG. 6 illustrates operation of the exemplary embodiment in which S1 handover related signalling is terminated at the gateway during a normal handover from one small cell to another.

As seen in FIG. 6, when a handover becomes necessary (at S600), the source small cell base station 5-2 generates and sends an S1 message towards the core network 7 (i.e. to the small cell gateway 14) (at S612) to indicate that handover is required and to request that handover takes place (e.g. an S1AP Handover Required message).

The small cell gateway 14 intercepts the message indicating that handover is required and does not forward it to the MME 12 but instead processes it in the small cell gateway 14 and generates a message requesting handover (e.g. an S1AP: Handover Request message) and sends it (at S614) to the base station 5-1, 5-3 of the target cell 10-1, 10-3 and informing the base station 5-1, 5-3 of the target cell 10-1, 10-3 of relevant information such as a list providing details of each Radio Access Bearer (E-RAB) that needs to be set up.

In order to allow the small cell gateway 14 to provide the relevant information to encode the S1AP Handover Request message that are sent to small cell base station directly, the relevant information (UE context) is stored at the small cell gateway 14 (e.g. information identifying the E-RABs that have been established, transport layer address. E-RAB level quality of service parameters, Aggregate Maximum Bit Rate) in association with information identifying the mobile communication device to which the information relates. This information is obtained by intercepting appropriate S1 messages that are forwarded to and from the MME 12 during normal operation (e.g. operation to set up communication, establish radio access bearers etc.,) and storing relevant message contents for later use white preparing messages, like the S1. Handover Request, for facilitating small gateway terminated handover procedures it will be appreciated that if the small ceil gateway 14 is unable to fill in all the relevant information it can revert to forwarding the S1 messages to the MME 12 for the MME 12 to handle the handover signalling appropriately.

The base station 5-1, 5-3 of the target cell 10-1, 10-3 responds (at S616) with a suitable acknowledgement (e.g. an S1AP: Handover Request Acknowledgement message) which may indicate that the appropriate communication bearers have been successfully set up.

The small cell gateway 14 intercepts the acknowledgement message and does not forward it to the MME 12 but instead processes it in the small cell gateway 14 and generates and sends a message instructing handover (e.g. an S1AP: Handover Command message) to the base station 5-2 of the source cell 5-2 (at S628).

At this point forwarding of undelivered downlink data takes place (if possible and if required) between the base station 5-2 of the source cell 10-2 and the base station 5-1, 5-3 of the target cell 10-1, 10-3 (at S630).

The target small cell base station 5-1, 5-3 sends an appropriate notification message (e.g. an S1AP. Handover Notify message) (at S632), once the mobile communication device 3 subject to the handover has been identified in the target cell 10-1, 10-3 and that S1 handover has been completed at the target end.

The small cell gateway 14 intercepts the notification message and does not forward it to the MME 12 but instead processes it in the small cell gateway 14 and generates and sends a message instructing release of the mobile communication device's context at the source cell 10-2 (e.g. an S1AP: UE Context Release Command message) to the base station 5-2 of the source cell 5-2 (at S636).

The base station 5-2 of the source cell 10-2 responds by releasing the mobile communication device's context and confirms that the mobile communication device's context has been released at the source cell 10-2 by sending an appropriate message (e.g. an S1AP: UE Context Release Complete message) to the small cell gateway 14 (at S638).

It will be appreciated that in the above operation, the security context is not updated between MME 12 and small cell gateway 14 after the mobile device has moved from one small cell to another small cell because there is no signalling towards the core network 7. In order to mitigate the security risk that this might cause, a number of handovers or 'hops' can beneficially be defined (e.g. by the operator) during which handover signalling will Terminate in the small cell gateway. Once this predefined number of 'hops' has been reached the next small cell gateway 14 routes handover signalling via the core network for the next handover in order to ensure that the security context is updated. The small cell gateway 14 can return to small cell gateway terminated signalling for another set of 'hops' and so on. Accordingly, in this way security is compromised for a configurable number of hops only. Information identifying the predetermined number of hops can be exchanged between MME 12 and small cell gateway 14 using S1 signalling or can be provided by an operation and maintenance (OAM) function.

Operation—Partial Rejection

Figure 7:
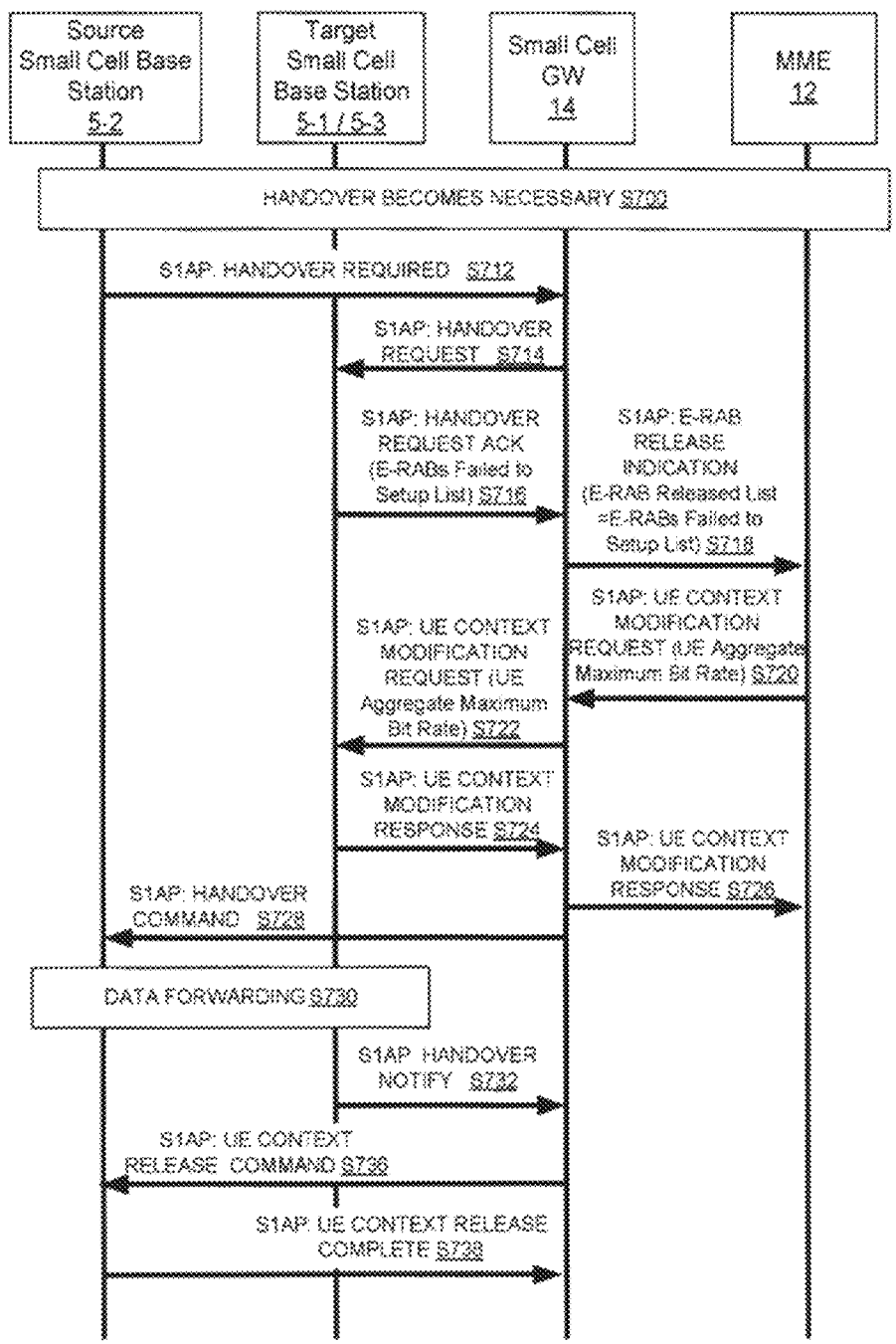
FIG. 7 is an exemplary timing diagram illustrating another method performed by components of the mobile telecommunication system of FIG. 1 whilst carrying out an embodiment of the invention.

FIG. 7 illustrates operation of the exemplary embodiment in which S1 handover related signalling is terminated at the gateway during a handover from one small cell to another in which handover is partially rejected, e.g. due to a failure in the set up of some radio access bearers at the base station 5-1, 5-3 of the target cell 10-1, 10-3.

As seen in FIG. 7, when a handover becomes necessary (at S700), the source small cell base station 5-2 proceeds much in the same way as in FIG. 6 by generating and sending an S1 message to the small cell gateway 14 (at S712) to indicate that handover is required and to request that handover takes place (e.g. an S1AP: Handover Required message).

The small cell gateway 14 intercepts the message indicating that handover is required and does not forward it to the MME 12 but instead processes it in the small cell gateway 14 and generates a message requesting handover (e.g. an S1AP: Handover Request message) and sends it (at S714) to the base station 5-1, 5-3 of the target cell 10-1, 10-3 and informing the base station 5-1, 5-3 of the target cdl 10-1, 10-3 of relevant information such as a list providing details of each Radio Access Bearer (E-RAB) that needs to be set up.

The base station 5-1, 5-3 of the target cell 10-1, 10-3 responds (at S716) with a suitable acknowledgement (e.g. an S1AP Handover Request Acknowledgement message) which indicates that the some of the communication bearers have not been successfully set up (e.g. in an E-RABs Failed to Setup list information element).

The small cell gateway 14 intercepts the acknowledgement message and does not forward it to the MME 12 but instead processes it in the small cell gateway 14 and determines that handover has, in effect, been partially rejected. The small cell gateway 14 responds to this determination (at S718) by sending a message to the MME 12 identifying the bearers that have failed to set up (e.g. in a E-RABs Released List information element (IE) in an S1AP E-RAB Release Indication message).

The MME 12 may respond by determining a new aggregate maximum bit rate and by notifying the small cell gateway 14 (at S720) of the new aggregate maximum bit rate in an appropriate message (e.g. S1AP. HE Context Modification Request with a UE Aggregate Maximum Bit Rate IE set appropriately). The small cell gateway 14 forwards the message carrying the new aggregate maximum bit rate to the base station 5-1, 5-3 of the target cell 10-1, 10-3 (at S722).

The base station 5-1, 5-3 of the target cell 10-1, 10-3 responds to the message carrying the new aggregate maximum bit rate by modifying the context of the mobile communication device 3 in the target cell 10-1, 10-3 by changing the aggregate maximum bit rate appropriately and by generating and sending a corresponding response message (e.g. an S1AP: UE Context Modification Response message) to the small cell gateway 14 (at S724).

The small cell gateway 14 also generates and sends a message instructing handover (e.g. an S1AP: Handover Command message) to the base station 5-2 of the source cell 5-2 (at S728). At this point forwarding of undelivered downlink data takes place (if possible and if required) between the base station 5-2 of the source cell 10-2 and the base station 5-1, 5-3 of the target cell 10-1, 10-3 (at S730).

The target small cell base station 5-1, 5-3 sends an appropriate notification message (e.g. an S1AP: Handover Notify message) (at S732), once the mobile communication device 3 subject to the handover has been identified in the target cell 10-1, 10-3 and that S1 handover has been completed at the target end.

The small cell gateway 14 intercepts the notification message and does not forward it to the MME 12 but instead processes it in the small cell gateway 14 and generates and sends a message instructing release of the mobile communication device's context at the source cell 10-2 (e.g. an S1AP: UE Context Release Command message) to the base station 5-2 of the source cell 5-2 (at S736).

The base station 5-2 of the source cell 10-2 responds by releasing the mobile communication device's context and confirms that the mobile communication device's context has been released at the source cell 10-2 by sending an appropriate message (e.g. an S1AP: UE Context Release Complete message) to the small cell gateway 14 (at S738).

Operation—Location Reporting

Figure 8:
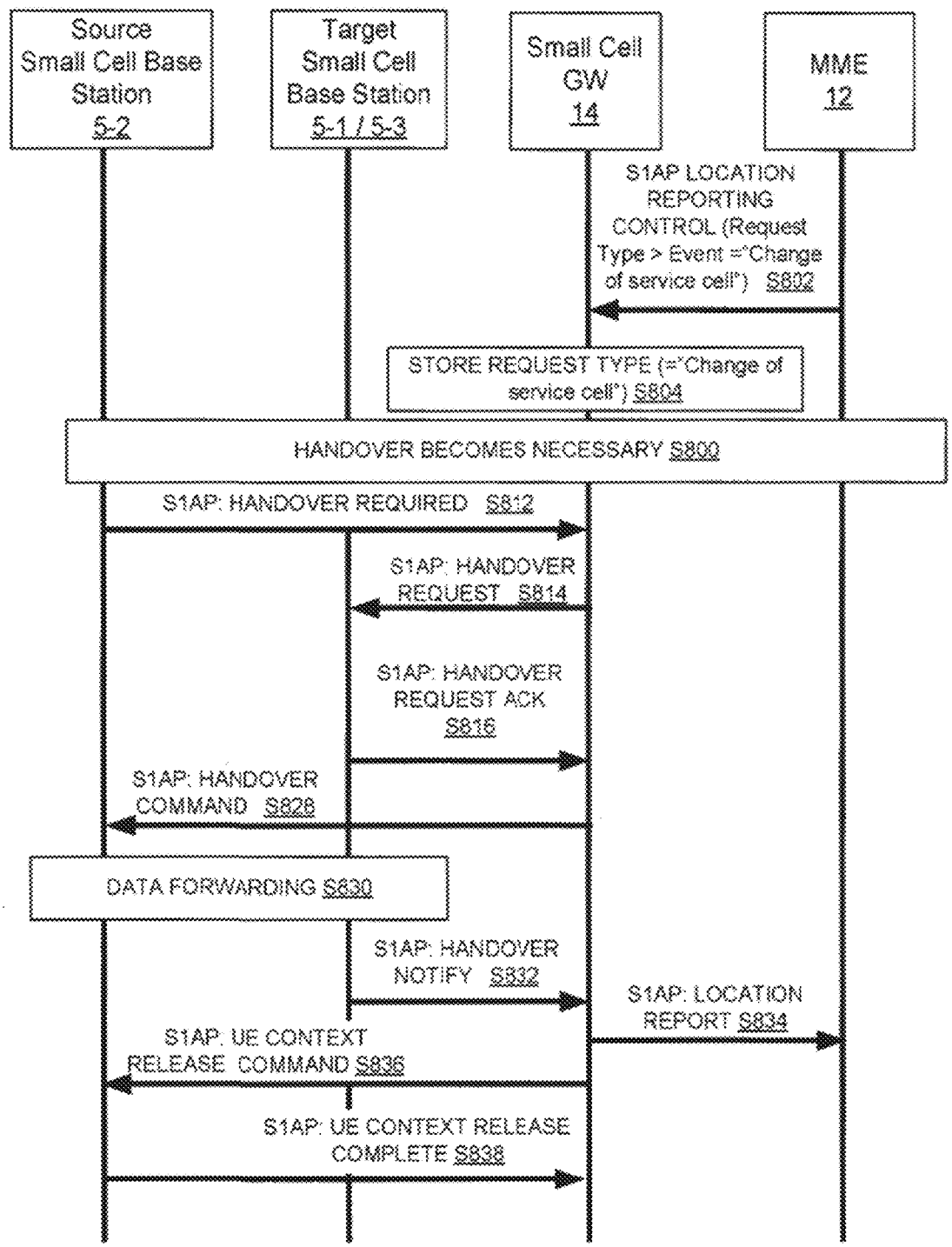
FIG. 8 is an exemplary timing diagram illustrating another method performed by components of the mobile telecommunication system of FIG. 1 whilst carrying out an embodiment of the invention.

FIG. 8 illustrates operation of the exemplary embodiment in which S1 handover related signalling is terminated at the gateway during a normal handover from one small cell to another but in winch the MME 12 requires location information.

As seen in FIG. 8, before handover becomes necessary, the MME 12 indicates (at S802) that location reporting is required by sending an appropriate location repotting control message indicating that location reporting is required in the event of a change of serving cell) (e.g. an S1AP Location Reporting Control message with a Request Type IE set to Event IE in the Request Type IE set to "Change of service cell"). It will be appreciated that an inbound mobility request (e.g. an S1AP: Handover Request message) from MME 12 could be similarly configured to indicate that location reporting is required.

The small cell gateway 14 stores an indication that location reporting is required in the event of a change of serving cell at S804.

When a handover becomes necessary (at S800), the source small cell base station 5-2 proceeds much in the same way as in FIG. 6 by generating and sending an S1 message to the small cell gateway 14 (at S812) to indicate that handover is required and to request that handover takes place (e.g. an S1AP: Handover Required message).

The small cell gateway 14 intercepts the message indicating that handover is required and does not forward it to the MME 12 but instead processes it in the small cell gateway 14 and generates a message requesting handover (e.g. an S1AP: Handover Request message) and sends it (at S814) to the base station 5-1, 5-3 of the target cell 10-1, 10-3 and informing the base station 5-1, 5-3 of the target cell 10-1, 10-3 of relevant information such as a list providing details of each Radio Access Bearer (E-RAB) that needs to be set up.

The base station 5-1, 5-3 of the target cell 10-1, 10-3 responds (at S816) with a suitable acknowledgement (e.g. an S1AP Handover Request Acknowledgement message) which may indicate that the appropriate communication bearers have been successfully set up.

The small cell gateway 14 intercepts the acknowledgement message and does not forward it to the MME 12 but instead processes it in the small cell gateway 14 and generates and sends a message instructing handover (e.g. an S1AP Handover Command message) to the base station 5-2 of the source cell 5-2 (at S828).

At this point forwarding of undelivered downlink data takes place (if possible and if required) between the base station 5-2 of the source cell 10-2 and the base station 5-1, 5-3 of the target cell 10-1, 10-3 (at S830).

The target small cell base station 5-1, 5-3 sends an appropriate notification message (e.g. an S1AP: Handover Notify message) (at S832), once the mobile communication device 3 subject to the handover has been identified in the target cell 10-1, 10-3 and that S1 handover has been completed at the target end.

The small cell gateway 14 intercepts the notification message and does not forward it to the MME 12 but instead processes it in the small cell gateway 14 and determines that location reporting is now required as a result of the change of cell. Accordingly, the small cell gateway 14 generates and sends a location report (e.g. an S1AP LOCATION REPORT message) as S834 to the MME 12 in accordance with the earlier request and associated stored information.

The small cell gateway 14 then generates and sends a message instructing release of the mobile communication device's context at the source cell 10-2 (e.g. an S1AP: UE Context Release Command message) to the base station 5-2 of the source cell 5-2 (at S836).

The base station 5-2 of the source cell 10-2 responds by releasing the mobile communication device's context and confirms that the mobile communication device's context has been released at the source cell 10-2 by sending an appropriate message (e.g. an S1AP: UE Context Release Complete message) to the small cell gateway 14 (at S838).

Operation—Status Transfer

Figure 9:
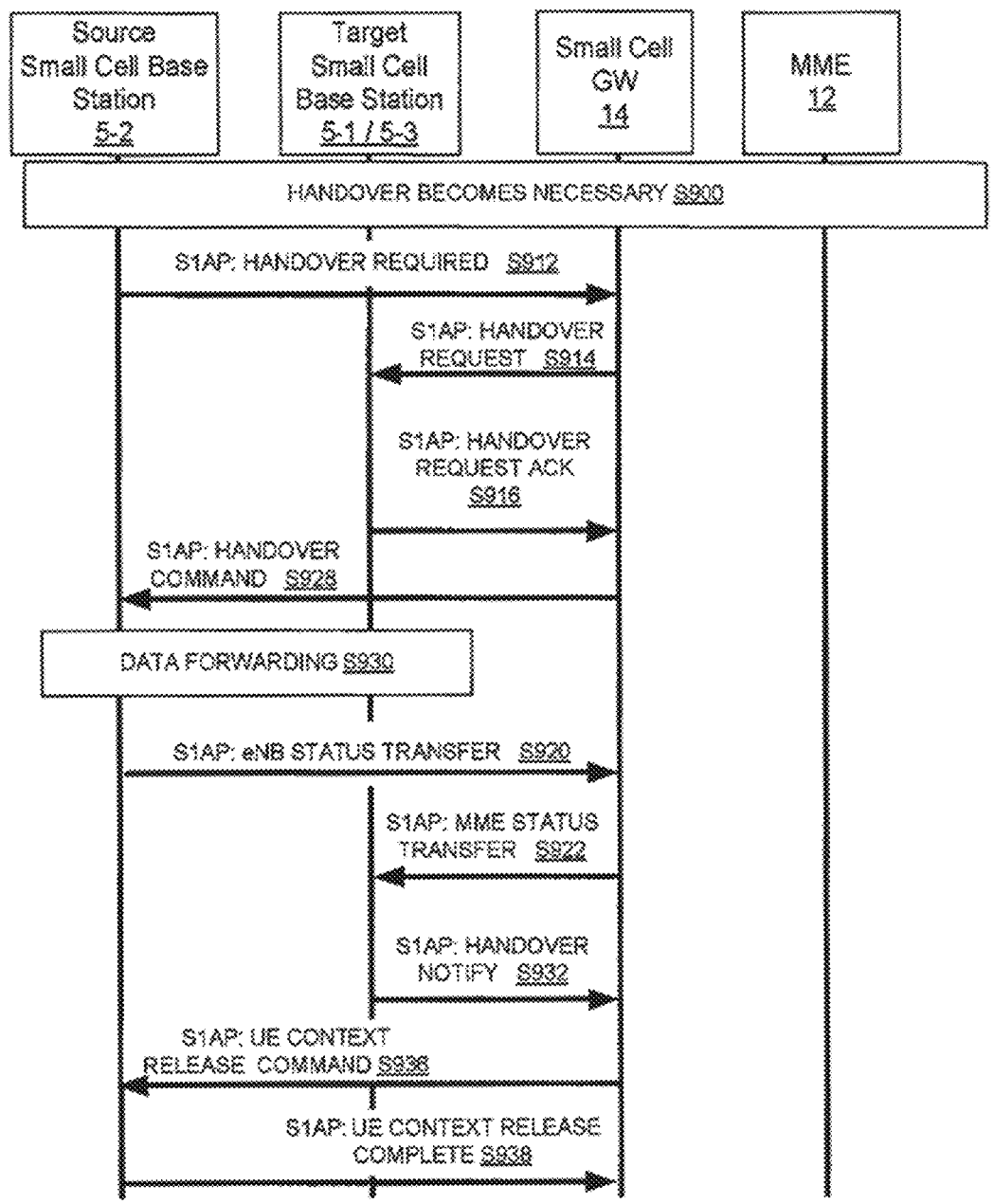
FIG. 9 is an exemplary timing diagram illustrating another method performed by components of the mobile telecommunication system of FIG. 1 whilst carrying out an embodiment of the invention.

FIG. 9 illustrates operation of the exemplary embodiment in which S1 handover related signalling is terminated at the gateway during a normal handover from one small cell to another but in which a transfer of status information (e.g. uplink/downlink Packet Data Convergence Protocol (PDCP) Sequence Number (SN) and/or hyper frame number (HFN)) is required in support of in-sequence delivery of data and duplication avoidance for the handover. Such a status transfer may be required, for example, for each respective E-RAB for which PDCP-SN and HFN status preservation applies.

As seen in FIG. 9, when a handover becomes necessary (at S900), the source small cell base station 5-2 proceeds much in the same way as in FIG. 6 wherein the steps labelled using the format S6nn in FIG. 6 correspond to steps sharing the same last two digits but labelled using the format S9nn in FIG. 9.

Unlike FIG. 6, however, in FIG. 9 the base station 5-2 of the source cell 10-2 determines, after any data forwarding at S930, that a transfer of status information (e.g. uplink/downlink Packet Data Convergence Protocol (PDCP) Sequence Number (SN) and/or hyper frame number (HFN)) is required in support of in-sequence delivery of data and duplication avoidance for the handover. The base station 5-2 of the source cell 10-2 generates and sends an appropriate status transfer message (e.g. an S1AP: eNB Status Transfer Message) towards the core network 7 at S920.

The small cell gateway 14 intercepts the status transfer message and does not forward it to the MME 12 but instead processes it in the small cell gateway 14 and in response to the message generates an appropriate status transfer message (e.g. an S1AP: MME Status Transfer Message) for sending to the base station 5-1, 5-3 of the target cell 10-1, 10-3.

The remaining procedure then continues much in the same way as in FIG. 6.

Operation—Data Forwarding

There are two data forwarding schemes which are supported by the small cell gateway 14 for S1 based Small Cell to Small Cell handover. The two schemes include direct data forwarding and indirect data forwarding and these are described below.

Moreover, in the case of indirect data forwarding, two different methods are described below depending on the architecture chosen for the small cell gateway 14. The two different architectures are illustrated in FIGS. 10 and 11.

Figure 10:
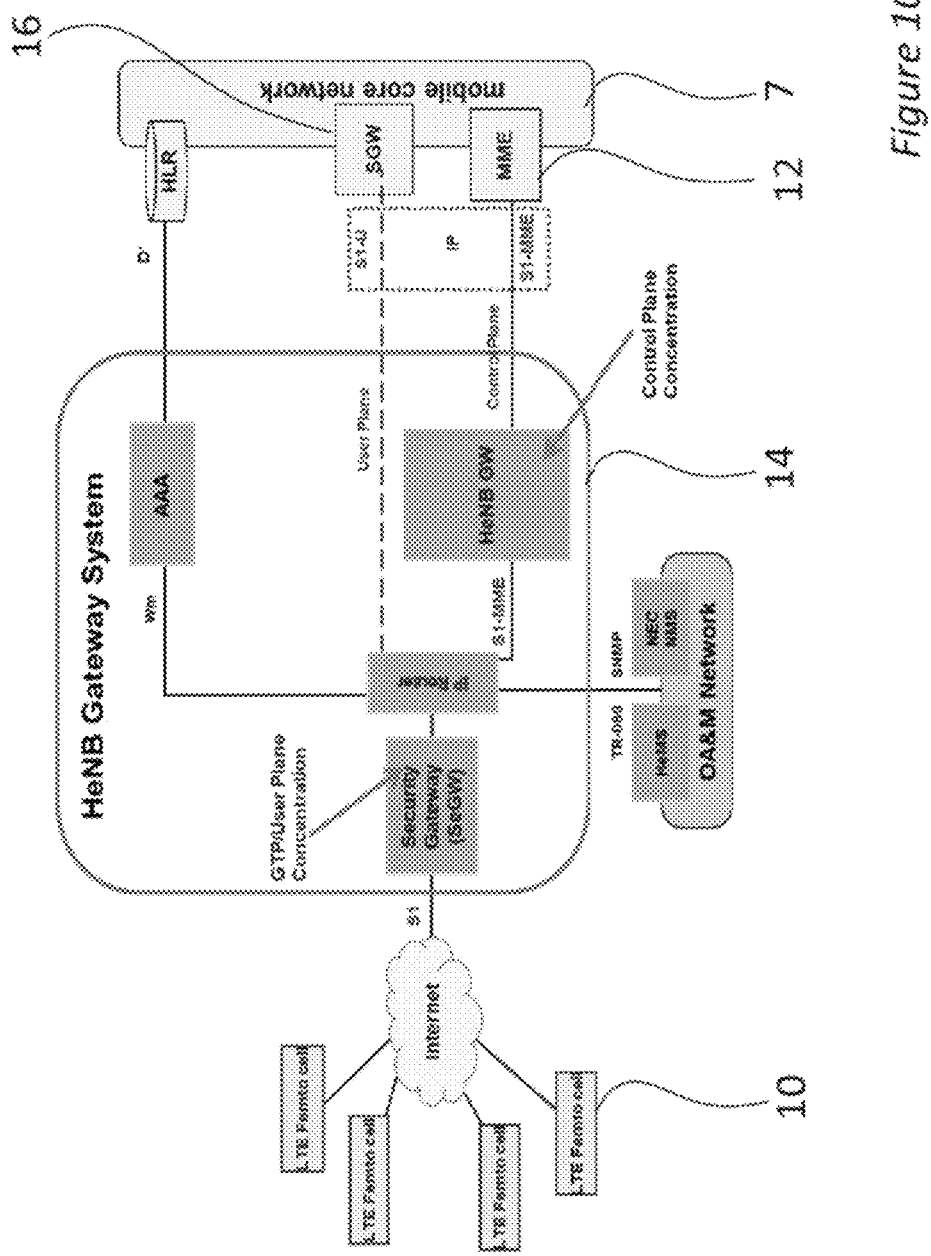
FIG. 10 illustrates an architecture for a small cell gateway.
Figure 11:
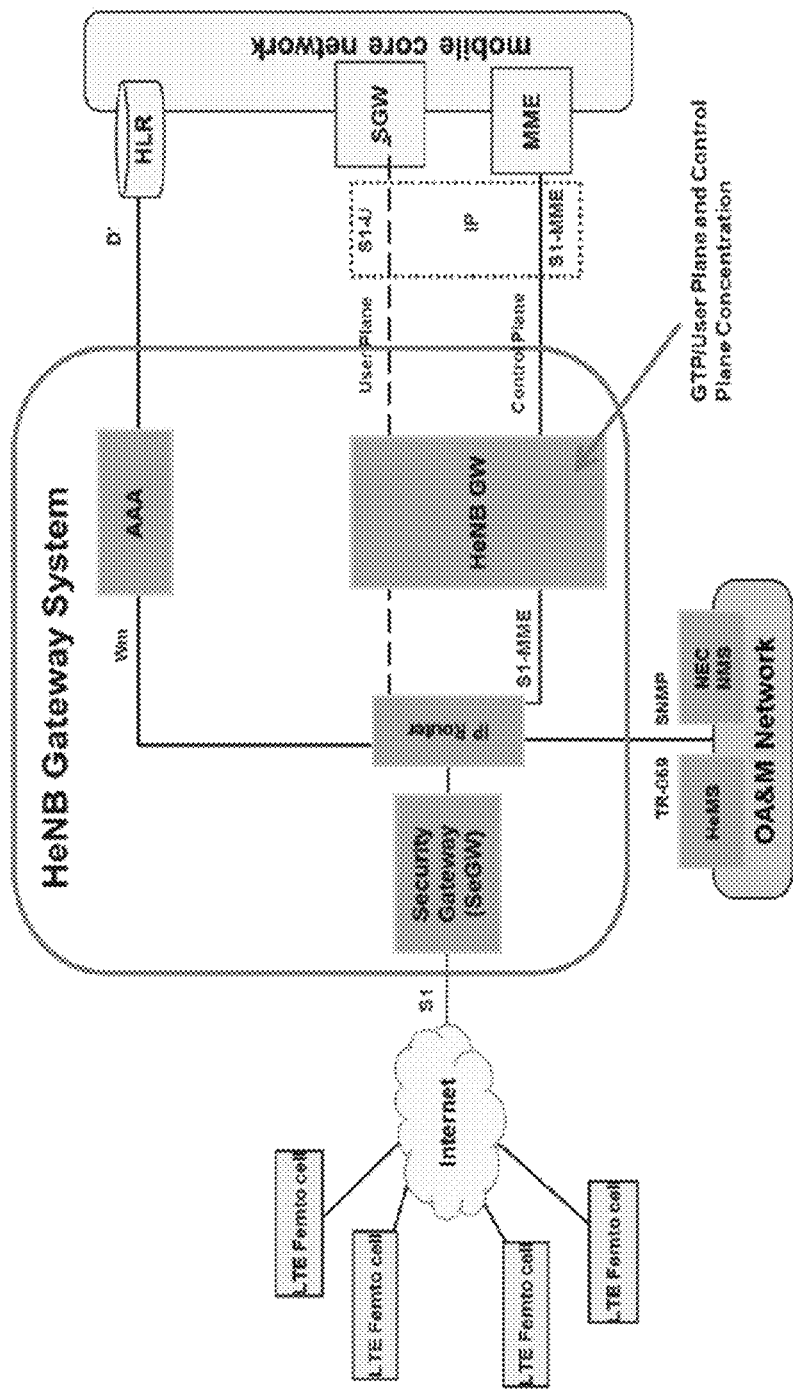
FIG. 11 illustrates another architecture for a small cell gateway.

In the architectures shown in FIGS. 10 and 11 the LTE Femto cells correspond to the small cells 10 described above and these are connected to small cell gateway apparatus 14 (in this example a HeNB gateway system). The HeNB gateway system in each case comprises security gateway (SeGW) to which the small cells are connected into the small cell gateway apparatus 14 via the internet and an S1 interface. The SeGW is connected via an IP router to a home location register (HLR) via an Authentication, Authorization and Accounting (AAA) function, to Operation and Maintenance (OA&M) network, and to a HeNB GW function. In each of the architectures shown in FIGS. 10 and 11 control plane signalling is routed, from the IP router, to the MME 12 of the core network 7 via an S1-MME interface and the HeNB GW function. In the architecture shown in FIG. 11 user plane signalling is also routed, from the IP router, to the core network 7 (to the SGW 16) via the HeNB GW function (and an S1-U interface). In the architecture shown in FIG. 10, however, user plane signalling is not routed, front the IP router, via the HeNB GW function but is instead routed directly, from the IP router, via an S1-U interface to the SGW 16 of the core network 7. The SeGW may be a physically separate communication entity to the HeNB GW.

Accordingly, in the architecture of FIG. 10, the user plane is terminated in the SeGW and the control plane is terminated in the HeNB GW whereas, in the architecture of FIG. 11, the user and control planes are each terminated in the HeNB GW.

Similarly, in the architecture of FIG. 10, GPRS Tunnelling Protocol (GTP) functions are provided in the SeGW whereas, in the architecture of FIG. 11, these are provided in the HeNB GW.

Direct Data forwarding

If the direct forwarding is available from the source small cell 10-2 to the target small cell 10-1, 10-3, then the base station 5-2 of the source small cell 10-2 indicates this in the S1 message sent to the small cell gateway 14 to indicate that handover is required and to request that handover takes place (e.g. by setting a Direct Forwarding Path Availability IE to "Direct Path is Available" in the S1AP: Handover Required message sent at S612 in FIG. 6 or corresponding steps in FIGS. 7 to 9).

The small cell gateway 14 processes the message indicating that handover is required, determines that direct forwarding is available, and hence informs the base station 5-1, 5-3 of the target small cell 10-1, 10-3 of this in the message requesting handover (e.g. in the S1AP: Handover Request message sent at S614 in FIG. 6 or corresponding steps in FIGS. 7 to 9). Specifically, the small cell gateway 14 indicates that direct forwarding is available by deliberately not configuring, in the S1AP Handover Request message, the "Data forwarding not possible IE" for each bearer represented in the "E-RABs To Be Setup Item IEs" for which direct forwarding is available.

When the small cell gateway 14 sends the message instructing handover (e g an S1AP: Handover Command message) to the base station 5-2 of the source cell 5-2 (e.g.

at S628 in FIG. 6 or corresponding steps in FIGS. 7 to 9). The small cell gateway 14 configures the message instructing handover to identify the addresses allocated, and associated tunnelling identities (TEIDs), for each radio access bearer subject to forwarding, for example by configuring the "E-RABs Subject to Forwarding List" IE in the S1AP: Handover Command message to include a list of addresses and TEIDs allocated for forwarding. The E-RABs to Release List IE include a list of all the bearers to be released.

After this, the base station 5-2 of the source cell 5-2 can start forwarding downlink data towards the base station 5-1, 5-3 of the target small cell 10-1, 10-3 (e.g. at S630 in FIG. 6 or corresponding steps in FIGS. 7 to 9). During this data forwarding process, therefore, the base station 5-2 of the source cell 5-2 forwards downlink data directly to the base station 5-1, 5-3 of the target small cell 10-1, 10-3. The SeGW in the case of the variant shown in FIG. 10 and the HeNB-GW function in the case of the variant shown in FIG. 11 is not involved.

Indirect Data Forwarding

If the direct forwarding is not available front the source small cell 10-2 to the target small cell 10-1, 10-3, then the base station 5-2 of the source small cell 10-2 indicates this in the S1 message sent to the small cell gateway 14 to indicate that handover is required and to request that handover takes place (e.g. by setting a Direct Forwarding Path Availability IE to "Direct Path is Not Available" in the S1AP: Handover Required message sent at S612 in FIG. 6 or corresponding steps in FIGS. 7 to 9).

The small cell gateway 14 processes the message indicating that handover is required, determines that direct forwarding is not available, and hence informs the base station 5-1, 5-3 of the target small cell 10-1, 10-3 of this in the message requesting handover (e.g. in the S1AP: Handover Request message sent at S614 in FIG. 6 or corresponding stops in FIGS. 7 to 9), Specifically, the small cell gateway 14 indicates that direct forwarding is not available by deliberately configuring, in the S1AP Handover Request message, the "Data forwarding not possible IE" for each bearer represented in the "E-RABs To Be Setup Item IEs" for which direct forwarding is not available.

In the case of the architecture in FIG. 10, the HeNB-GW uses parameters (target Small Cell addresses, TEID and E-RAB pair for forwarding) for setting up the forwarding path tunnel by sending a forwarding tunnel creation request (e.g. a Create Indirect Data Forwarding Tunnel Request message) to SeGW to initiate configuration of an appropriate communication tunnel for forwarding the data. The SeGW responds with a corresponding response message (e.g. a Create Indirect Data Forwarding Tunnel Response message) comprising SeGW addresses. TEID and information identifying the E-RAB pair for forwarding.

In the case of the architecture in FIG. 11 the HeNB-GW function uses appropriate parameters (target Small Cell addresses and TEIDs for forwarding) for setting up the forwarding path tunnel.

When the small ceil gateway 14 sends the message instructing handover (e.g. an S1AP: Handover Command message) to the base station 5-2 of the source cell 5-2 (e g at S628 in FIG. 6 or corresponding steps in FIGS. 7 to 9). The small cell gateway 14 configures the message instructing handover to identify the addresses allocated, and associated tunnelling identities (TEIDs), for each radio access bearer subject to forwarding, for example by configuring the "E-RABs Subject to Forwarding List" IE in the S1AP: Handover Command message to include a list of addresses and TEIDs allocated for forwarding. The E-RABs to Release List IE include a list of all the bearers to be released.

After this, the base station 5-2 of the source cell 5-2 can start forwarding downlink data towards the base station 5-1, 5-3 of the target small cell 10-1, 10-3 (e.g. at S630 in FIG. 6 or corresponding steps in FIGS. 7 to 9). During this data forwarding process, therefore, the base station 5-2 of the source cell 5-2 forwards downlink data indirectly to the base station 5-1, 5-3 of the target small cell 10-1, 10-3 via the forwarding path tunnel.

In the case of the architecture in FIG. 10, during the data forwarding process, the SeGW effectively works as the U-plane anchor point for forwarding the U-plane packets from the source small cell 10-2 to the target small cell 10-1, 10-3.

In the case of the architecture in FIG. 11, during the data forwarding process, the HeNB-GW effectively works as the U-plane anchor point to forward the U-plane packets from the source small cell 10-2 to the target small cell 10-1, 10-3.

On receipt of the notification message (e.g. an S1AP: Handover Notify message) informing the small cell gateway that handover has effectively been completed at the target end (e.g. at S632 in FIG. 6 or corresponding steps in FIGS. 7 to 9), the HeNB-GW starts a timer for releasing the data forwarding resource.

In the case of the architecture in FIG. 10, after the timer has expired the HeNB-GW generates a message to initiate release of the temporary resources used for indirect forwarding (e.g. a Delete Indirect Data Forwarding Tunnel Request message) and sends it to the SeGW to initiate the release.

In the case of the architecture in FIG. 11, after the timer expires, the HeNB-GW releases the temporary resources used for indirect forwarding itself.

Dual Connectivity

As explained above FIG. 2 illustrates an embodiment in which a 'virtual' dual connectivity is advantageously provided even though there is no physical macro cell in the vicinity. It will be appreciated that although this is described as a different embodiment some (or all) of the features of both embodiments could, potentially, be implemented in the same communication device as appropriate in order to provide different options to an end user.

Figure 12:
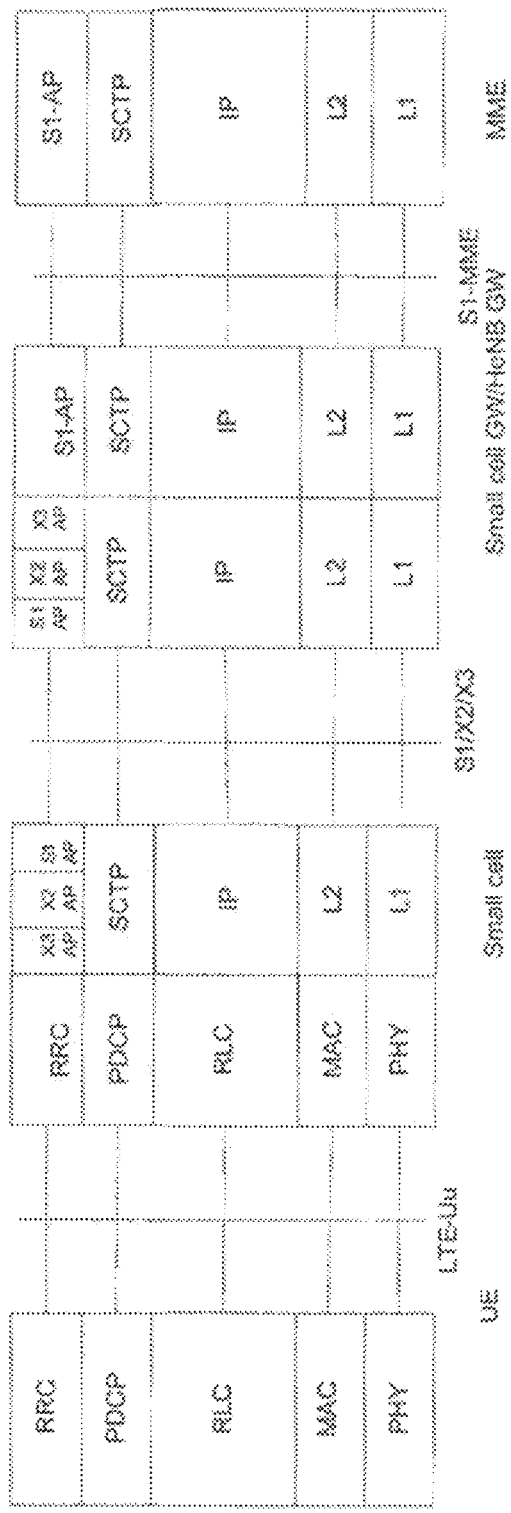
FIG. 12 shows an exemplary control plane architecture for an exemplary communication system.
Figure 13:
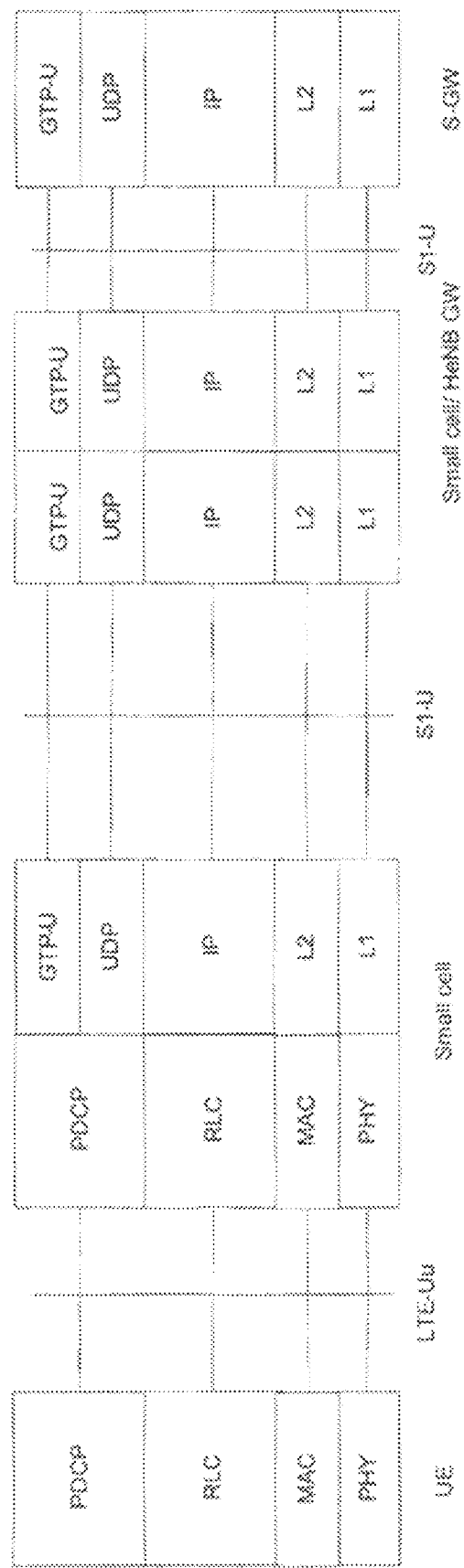
FIG. 13 shows an exemplary user plane architecture for an exemplary communication system.

FIGS. 12 and 13 respectively show a control plane architecture and a user plane architecture in a communication system in which 'virtual' dual connectivity is provided by having the small cell gateway 14 administer a virtual macro cell which acts to terminate X2 signalling.

In order to achieve 'virtual' dual connectivity the 'virtual' macro cell context is stored in the small cell gateway 1, and the mobile communication device 3 has a virtual association to the virtual macro cell 15 but not a physical association. This virtual macro cell 15 acts as a primary cell (PCell) whilst the small cells 10 operate as secondary cells (SCells) in which control signalling is limited.

As seen in FIGS. 12 and 13, in the control plane, the mobile communication device 3 has a radio resource control (RRC) and other control connections to the small cell base station 5 as normal. No RRC state machine is provided in the small cell gateway 14 but the gateway maintains the RRC context for the mobile communication device 3. Small cells may be added/deleted as secondary cells in a manner similar to Scell addition/deletion as defined, for example in section 5.3.10.3b of TS 36.331 V11.3.0.

The mobile communication device 3 maintains security keys derived from the initial connection with the first small cell 10 operating as a secondary cell (SCell) to the virtual macro cell 15 acting as the PCell. The mobile communication device 3 is configured to store and maintain these keys in response to art indication that these keys should be preserved provided by the base station 5 operating the first cell via which the mobile communication device 3 connects (e.g. following initial configuration of the non access stratum (NAS) and access stratum (AS) security contexts).

More specifically, the mobile communication device 3 is explicitly informed that the virtual macro cell 15 exists and stores security keys (AS and NAS) accordingly. During a move from one small cell to another, the source small cell base station 5 transfers tire security keys to small cell gateway 14 as part of the security context for that mobile communication device and the gateway continues to transfer these keys to the respective base station 5 of each small cell 10 to which the mobile communication device 3 moves. The number of times that the security keys are transferred in this way is limited to a predetermined number of 'hops' which may be reconfigurable or fixed. It will be appreciated that where all the small cells in one hop use tire same tracking area identity there is no issue related to NAS mobility information reference.

When the number of 'hops' reaches its limit, normal security handling shall be performed to re-initialise the security context with new keys thereby limiting any security risk associated with the re-use of keys and the transfer of keys between small cell base station 5 and the small cell gateway 14.

Unlike existing methods for adding Scells, the addition of SCells for the purposes of virtual dual connectivity involves the setting up of a Packet Data Convergence Protocol (PDCP), Radio Link Control (RLC) and Medium Access Control (MAC) configuration during adding another small cell 10 as SCell by including PDCP, RLC and MAC information in the RRC message.

In order to alleviate the additional signalling overhead associated with the need to setting up the PDCP, RLC and MAC configurations the 'delta' signalling may be used to signal only modifications to the configurations (e.g. only new/modified parameters compared to an existing configuration).

The mobile communication device 3 continues to receive system information in connected mode from the base station 5 of the small cell 10 via which it is connected. The virtual Pcell 15 does not send any system information because no system information exists for such a Pcell 15. Similarly, Earthquake and Tsunami Wanting System (ETWS)/Commercial Mobile Alert System (CMAS) notifications are provided from via the small cell 10 acting as an Scell only because no such information is available from the virtual Pcell 15. The mobile communication device 3 also receives paging information from the base station 5 of the small cell 10.

Unlike current systems in which a Pcell Cell Radio Network Temporary Identifier (C-RNTI—an identifier allocated by a base station, to a mobile communication device, to be unique within one cell controlled by that base station) is used in SCells as well. The C-RNTI for an SCell to a virtual PCell is carried out by the base station 5 of the small cell 10. Whilst the same C-RNTI allocation could be kept throughout multiple 'hops' from one small cell to another this may restrict the number of available C-RNTIs and could potentially cause C-RNTI collision. Accordingly, in this embodiment, the C-RNTI is not kept when a move to a new small cell 10 occurs.

Operation—Dual Connectivity

Figure 14:
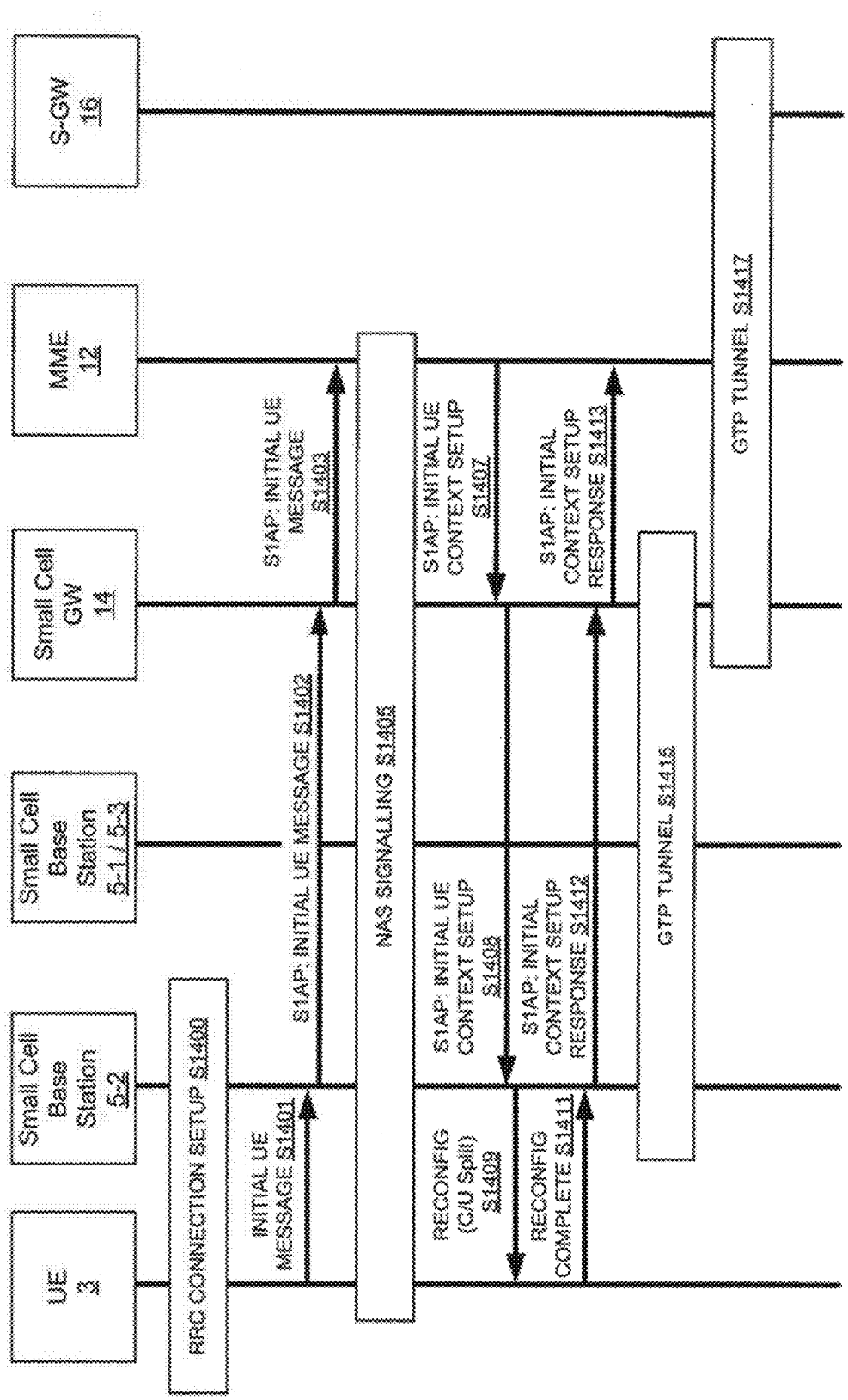
FIG. 14 is an exemplary timing diagram for an initial RRC connection establishment by a mobile communication device.
Figure 15:
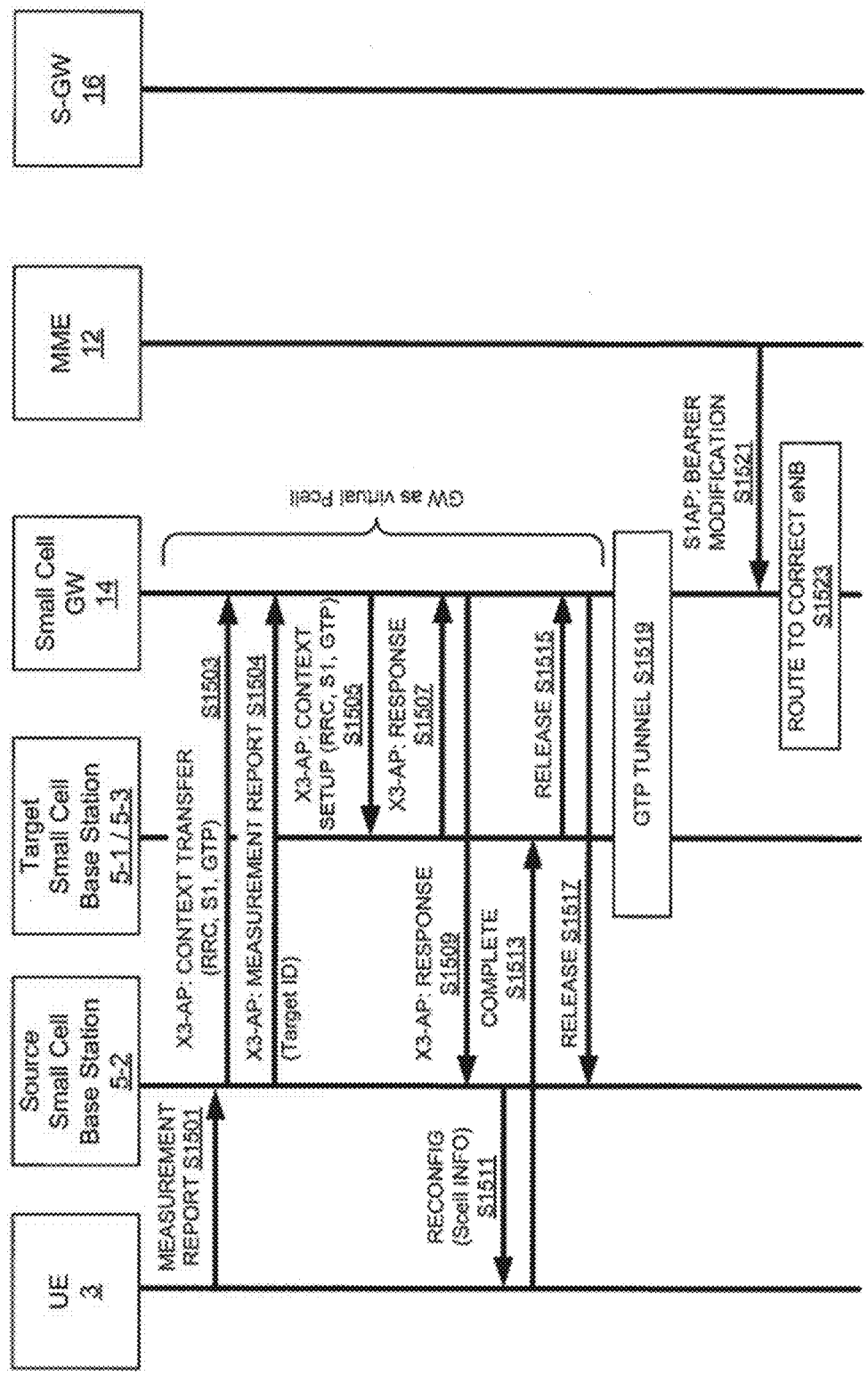
FIG. 15 is an exemplary timing diagram illustrating a handover scenario in a communication system configured for virtual dual connectivity.

Typical operation in a communication system configured for virtual dual connectivity will now be described, by way of example only, with reference to FIGS. 14 and 15 in which FIG. 14 is a timing diagram for an initial RRC connection establishment by a mobile communication device 3 in a small cell 10 and FIG. 15 is a timing diagram illustrating a handover scenario in a communication system configured for virtual dual connectivity.

Referring to FIG. 14 an initial RRC connection setup procedure begins at S1400. The mobile communication device 3 generates and sends an initial UE message to the base station 5-2 of a small cell 10-2. The initial UE message is propagated to the MME 12 via the small cell gateway 14 using S1 signalling (at S1402 and S1403). The MME 12 sets up of an NAS security context for the mobile communication device 3 at S1405 before initiating setup of an AS context for the mobile communication device 3 by sending an initial UK context setup message to the small cell gateway at S1407 which is then forwarded to the base station 5-2 of the small cell 10-2 at S1408. A reconfiguration message to configure bearer establishment and inform the mobile communication device that the control and user planes are virtually split between the small cell 10-2 and the virtual macro cell 15. Once reconfiguration is complete the mobile communication device confirms this to the base station 5-2 of the small cell 10-2 at S1411 and the base station 5-2 of the small cell 10-2 responds by sending an initial context setup response message to the small cell gateway 14 at S1412. The small cell gateway 14 forwards the initial context setup response message to the MME 12 at S1413 to complete set up of the initial connection. GTP communication tunnels are thus setup (S1415 and S1417) between the base station 5-2 of the small cell 10-2 and the small cell gateway 14 and between the small cell gateway 14 and the MME 12.

Referring to FIG. 15 a measurement report is sent to the base station 5-2 of a source small cell 10-2 at S1501. The base station 5-2 of the source small cell 10-2 determines that a transfer of cell may be necessary and prepares for this by transferring the mobile communication device's context (RRC, S1 and GTP) to the small cell gateway 14 at S1503 (e.g. using appropriate X2/X3 signalling such as an X3-AP. Context Transfer message) before forwarding the measurement report to the small cell gateway 14, using appropriate X2/X3 signalling including a target identifier for the target cell 10-1, 10-3 at S1504 (e.g. using appropriate X2/X3 signalling such as an X3-AP: Measurement Report message). The small cell gateway 14 stores the context for the mobile communication device 3 and, on receipt of the measurement report, initiates setup of a corresponding context for the mobile communication device 3 at the base station 5-1, 5-3 of the target small cell 10-1, 10-3 (e.g. using appropriate X2/X3 signalling such as an X3-AP. Context Setup message). The base station 5-1, 5-3 of the target small cell 10-1, 10-3 responds at S1507 to indicate that the context has been set up successfully. The small cell gateway 14 then responds, at S1509, appropriately to the original context transfer message from the base station 5-2 of the source small cell 10-2. On receipt of the response from the small cell gateway 14 the base station 5-2 of the source small cell 10-2 reconfigures the mobile communication device 3 by providing, at S1511, appropriate information to allow the mobile communication device 3 to connect to the base station 5-1, 5-3 of the target cell 10-1, 10-3 (e.g. in an SCell INFO information element or the like). Once the reconfiguration has completed successfully this is indicated directly to the base station 5-1, 5-3 of the new (target) cell 10-1, 10-3 at S1513. The base station 5-1, 5-3 of the new (target) cell 10-1, 10-3 notifies the small cell gateway 14 of this at S1515 and the small cell gateway 14 notifies the base station 5-2 of the old (source) cell 10-2.

In order to support the dual connectivity, the target small cell base station is added by using an Scell addition/deletion procedure (in contrast to the approach for a normal mobility procedure). For this procedure, security keys can advantageously be reused (without involving key derivation with the core network).

Based on the GTP context (e.g. E-RAB information of E-RAB ID, Transport layer address and GTP-TEID) exchanged during the S1505, S1507, the GTP tunnel is set up between the target small cell base station and the small cell gateway at S1519. Hence, user data packets can be transferred from the target small cell base station to the small cell gateway and then to the S-GW.

Referring to steps S1521 and S1523, the small cell gateway 14 is operable to terminates S1AP messages from the MME 12 (such as the S1AP Bearer Modification Request shown at S1521) so that the small cell gateway 14 can update the information stored at the gateway 14 (e.g. in a database) with the latest context for the mobile communication device according to the received S1AP message. The small cell gateway 14 then forwards the message to the correct small cell base station based on the context information for the mobile communication device (at S1523).

Modifications and Alternatives

A number of detailed exemplary embodiments have been described above. As those skilled in the art will appreciate, a number of modifications and alternatives can be made to the above exemplary embodiments whilst still benefiting from the inventions embodied therein.

Referring to the exemplary embodiment shown in FIG. 2 it will be appreciated that data forwarding could be implemented by having the source cell base station transfer the PDCP SN and Service Data Units (SDUs) for which no acknowledgement has been received, to the small cell gateway and having the small cell gateway forward this information to the target small cell base station. Such information can be transferred over an X3, a new interface, or an existing S1/X2 interface.

It will be appreciated that the MME may transfer the context to small cell gateway in a new S1 message instead of having a small cell transfer it as described with reference to FIG. 15. The small cell gateway may still intercept S1 messages so that when it receives an S1 message to modify a communication bearer the gateway knows where to route it to.

In the above exemplary embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the exemplary embodiments described above, the base station and the home base station each include transceiver circuitry. Typically this circuitry will be formed by dedicated hardware circuits. However, in some exemplary embodiments, part of the transceiver circuitry may be implemented as software run by the corresponding controller.

In the above exemplary embodiments, a number of software modules were described. As those skilled in the art will appreciate, the software modules may be provided in compiled or un-compiled form and may be supplied to the HENB or to the mobile telephone as a signal over a computer network, or on a recording medium. Further, the functionality performed by part or all of this software may be performed using one or more dedicated hardware circuits. However, the use of software modules is preferred as it facilitates the updating of the base stations, gateways, and the mobile telephones in order to update their functionalities.

Various other modifications will be apparent to those skilled in the art and will not be described in further detail here.

This application is based upon and claims the benefit of priority from United Kingdom patent application No. 1306216.1, filed on Apr. 5, 2013, the disclosure of which is incorporated herein in its entirety by reference.

The invention claimed is:

1. A method comprising:
communicating in a network in which a user equipment (UE) is configured to operate in a dual connectivity mode using a first cell and a second cell in which the UE has a radio resource control (RRC) connection;
receiving, from a first base station configured to operate the first cell, via a first interface, a message for transferring, to a second base station configured to operate the second cell, context information including information relating to the first base station and information relating to the second base station, the context information including context information in the form of an identifier for a corresponding bearer, Packet Data Convergence Protocol (PDCP) Sequence Number (SN) and hyper frame number (HFN); and
transmitting, to the second base station, via a second interface, the context information,
wherein the UE is configured to continue to operate in the dual connectivity mode after the transmitting the context information to the second base station.

2. An apparatus in a communication system, the apparatus comprising:
a first interface, which interfaces with a first base station configured to operate a first cell;
a second interface, which interfaces with a second base station configured to operate a second cell;
a transceiver configured to:
communicate in a network in which a user equipment (UE) is configured to operate in a dual connectivity mode using the first cell and the second cell in which the UE has a radio resource control (RRC) connection;
receive, from the first base station via the first interface, a message for transferring, to the second base station, context information including information relating to the first base station and information relating to the second base station, the context information including context information in the form of an identifier for a corresponding bearer, Packet Data Convergence Protocol (PDCP) Sequence Number (SN) and hyper frame number (HFN); and
transmit, to the second base station via the second interface, the context information,
wherein the UE is configured to continue to operate in the dual connectivity mode after transmitting the context information to the second base station.

* * * * *